US011720151B2

(12) United States Patent
Park et al.

(10) Patent No.: US 11,720,151 B2
(45) Date of Patent: Aug. 8, 2023

(54) HINGED DEVICE

(71) Applicant: Microsoft Technology Licensing, LLC, Redmond, WA (US)

(72) Inventors: Daniel C. Park, Woodinville, WA (US); Denys V. Yaremenko, Bellevue, WA (US)

(73) Assignee: Microsoft Technology Licensing, LLc, Redmond, WA (US)

(*) Notice: Subject to any disclaimer, the term of this patent is extended or adjusted under 35 U.S.C. 154(b) by 0 days.

(21) Appl. No.: 17/104,595

(22) Filed: Nov. 25, 2020

(65) Prior Publication Data
US 2022/0035419 A1 Feb. 3, 2022

Related U.S. Application Data

(60) Provisional application No. 63/060,459, filed on Aug. 3, 2020.

(51) Int. Cl.
*G06F 1/16* (2006.01)
(52) U.S. Cl.
CPC .......... *G06F 1/1681* (2013.01); *G06F 1/1616* (2013.01)
(58) Field of Classification Search
CPC .... G06F 1/1681; G06F 1/1616; G06F 1/1618; G06F 1/1679; H04M 1/022
See application file for complete search history.

(56) References Cited

U.S. PATENT DOCUMENTS

| 5,666,694 | A | 9/1997 | Kang et al. |
| 5,874,696 | A | 2/1999 | Hayashi et al. |
| 7,512,426 | B2 | 3/2009 | Maatta et al. |
| 7,631,410 | B2 | 12/2009 | Schlesener et al. |

(Continued)

FOREIGN PATENT DOCUMENTS

| CN | 109949707 A | 6/2019 |
| CN | 110166591 A | 8/2019 |

(Continued)

OTHER PUBLICATIONS

"International Search Report and Written Opinion Issued in PCT Application No. PCT/US2021/036076", dated Aug. 16, 2021, 14 Pages.

(Continued)

*Primary Examiner* — Anthony M Haughton
*Assistant Examiner* — Theron S Milliser
(74) *Attorney, Agent, or Firm* — Rainier Patents, P.S.

(57) ABSTRACT

The description relates to hinged devices, such as hinged computing devices. One example can include a first portion and a second portion that are rotatably secured to a hinge assembly that define a first hinge axis that the first portion rotates around and a second hinge axis that the second portion rotates around. The hinge assembly can also include a first timing gear associated with the first portion and a second timing gear associated with the second portion. The first timing gear can rotate around a first timing axis that is parallel to and offset from the first hinge axis. The second timing gear can rotate around a second timing axis that is parallel to and offset from the second hinge axis. The first and second timing gears can directly intermesh with one another to synchronize rotation around the first hinge axis and the second hinge axis.

10 Claims, 38 Drawing Sheets

(56) References Cited

U.S. PATENT DOCUMENTS

| | | | |
|---|---|---|---|
| 7,765,644 B2 | 8/2010 | Sakai | |
| 8,638,546 B2 | 1/2014 | Hoshino | |
| 8,982,542 B2* | 3/2015 | Bohn | G06F 1/1681 |
| | | | 361/679.28 |
| 9,342,101 B2* | 5/2016 | Hsu | G06F 1/1679 |
| 9,411,365 B1 | 8/2016 | Tanner et al. | |
| 9,625,952 B2 | 4/2017 | Holung et al. | |
| 9,857,849 B1 | 1/2018 | Siddiqui et al. | |
| 9,891,670 B2 | 2/2018 | Kim et al. | |
| 9,983,627 B1 | 5/2018 | Pelissier et al. | |
| 10,013,021 B2 | 7/2018 | Matsuoka | |
| 10,024,092 B1 | 7/2018 | Tanner et al. | |
| 10,088,875 B1 | 10/2018 | Lin | |
| 10,146,268 B2 | 12/2018 | Tazbaz | |
| 10,227,808 B2 | 3/2019 | Siddiqui | |
| 10,241,548 B2 | 3/2019 | Tazbaz et al. | |
| 10,253,804 B2 | 4/2019 | Park et al. | |
| 10,296,044 B2* | 5/2019 | Siddiqui | E05D 3/122 |
| 10,344,510 B2 | 7/2019 | Siddiqui et al. | |
| 10,345,866 B2 | 7/2019 | Tucker et al. | |
| 10,429,903 B2 | 10/2019 | Hong et al. | |
| 10,488,882 B2* | 11/2019 | Määttä | G06F 1/1616 |
| 10,501,973 B2 | 12/2019 | Määttä | |
| 10,545,541 B1 | 1/2020 | Dighde et al. | |
| 10,564,681 B2 | 2/2020 | Siddiqui | |
| 10,614,738 B2 | 4/2020 | Aurongzeb et al. | |
| 10,633,899 B2 | 4/2020 | Eshuis | |
| 10,641,318 B2 | 5/2020 | Siddiqui | |
| 10,642,317 B2 | 5/2020 | Trim et al. | |
| 10,754,377 B2 | 8/2020 | Siddiqui | |
| 10,761,572 B1 | 9/2020 | Siddiqui et al. | |
| 10,795,416 B2 | 10/2020 | Schmelzle et al. | |
| 10,905,020 B2* | 1/2021 | Jan | H05K 5/0226 |
| 10,931,070 B1 | 2/2021 | Files et al. | |
| 11,028,628 B2 | 6/2021 | Määttä | |
| 11,091,944 B2* | 8/2021 | Siddiqui | G06F 1/1616 |
| 11,106,248 B2* | 8/2021 | Campbell | H04M 1/022 |
| 11,119,535 B2 | 9/2021 | Haworth et al. | |
| 11,137,894 B1 | 10/2021 | Chen et al. | |
| 11,188,120 B2 | 11/2021 | Myung et al. | |
| 11,194,366 B2* | 12/2021 | Cheng | G06F 1/1652 |
| 11,229,133 B2 | 1/2022 | Kim | |
| 11,360,508 B2 | 6/2022 | Tzou et al. | |
| 11,366,498 B2 | 6/2022 | Shibayama et al. | |
| 11,379,015 B2 | 7/2022 | Lin et al. | |
| 11,543,861 B2 | 1/2023 | Park et al. | |
| 2010/0283270 A1 | 11/2010 | Hood et al. | |
| 2011/0291536 A1 | 12/2011 | Jauvtis et al. | |
| 2012/0047685 A1 | 3/2012 | Ma | |
| 2012/0120618 A1* | 5/2012 | Bohn | G06F 1/1618 |
| | | | 361/679.01 |
| 2014/0360296 A1* | 12/2014 | Hsu | G06F 1/1618 |
| | | | 74/98 |
| 2016/0109908 A1 | 4/2016 | Siddiqui | |
| 2017/0357294 A1 | 12/2017 | Siddiqui et al. | |
| 2018/0024596 A1 | 1/2018 | Park et al. | |
| 2018/0049336 A1 | 2/2018 | Manuel et al. | |
| 2018/0066465 A1 | 3/2018 | Tazbaz et al. | |
| 2018/0067520 A1* | 3/2018 | Määttä | G06F 1/1681 |
| 2018/0129459 A1 | 5/2018 | Sylvan et al. | |
| 2018/0164855 A1 | 6/2018 | Tazbaz et al. | |
| 2018/0166842 A1 | 6/2018 | Siddiqui | |
| 2018/0292860 A1 | 10/2018 | Siddiqui | |
| 2018/0356858 A1* | 12/2018 | Siddiqui | G06F 1/1637 |
| 2018/0363341 A1 | 12/2018 | Siddiqui et al. | |
| 2019/0094917 A1 | 3/2019 | Schmelzle et al. | |
| 2019/0166703 A1 | 5/2019 | Kim et al. | |
| 2019/0220064 A1 | 7/2019 | Park et al. | |
| 2019/0278338 A1 | 9/2019 | Siddiqui | |
| 2019/0301215 A1* | 10/2019 | Siddiqui | E05D 3/18 |
| 2019/0332239 A1 | 10/2019 | Ligameri et al. | |
| 2019/0332343 A1 | 10/2019 | Sylvan et al. | |
| 2020/0033917 A1 | 1/2020 | Tazbaz et al. | |
| 2020/0117233 A1 | 4/2020 | Ou et al. | |
| 2020/0128186 A1 | 4/2020 | Lombardi et al. | |
| 2020/0236801 A1* | 7/2020 | Jan | E05D 3/18 |
| 2020/0326756 A1* | 10/2020 | Siddiqui | E05D 3/122 |
| 2020/0363843 A1* | 11/2020 | Cheng | H04M 1/02 |
| 2021/0124544 A1 | 4/2021 | Bums et al. | |
| 2021/0132793 A1 | 5/2021 | Bums et al. | |
| 2021/0223828 A1 | 7/2021 | Kwon et al. | |
| 2021/0278942 A1 | 9/2021 | Jung | |
| 2021/0286411 A1 | 9/2021 | Park et al. | |
| 2021/0293066 A1 | 9/2021 | Määttä | |
| 2021/0325937 A1 | 10/2021 | Siddiqui et al. | |
| 2021/0397226 A1 | 12/2021 | Siddiqui | |
| 2022/0026959 A1 | 1/2022 | Moon | |
| 2022/0100238 A1 | 3/2022 | Siddiqui et al. | |
| 2022/0100239 A1 | 3/2022 | Siddiqui et al. | |
| 2022/0334619 A1 | 10/2022 | Park | |

FOREIGN PATENT DOCUMENTS

| | | |
|---|---|---|
| CN | 111131568 A | 5/2020 |
| JP | 2001262747 A | 9/2001 |
| KR | 20190077292 A | 7/2019 |
| WO | 2008100013 A1 | 8/2008 |
| WO | 2016140524 A1 | 9/2016 |
| WO | 2019134695 A1 | 7/2019 |

OTHER PUBLICATIONS

"International Search Report and Written Opinion Issued in PCT Application No. PCT/US2021/036078", dated Aug. 17, 2021, 14 Pages.

"International Search Report and Written Opinion Issued in PCT Application No. PCT/US21/030765", dated Jul. 26, 2021, 15 Pages.

"Notice of Allowance Issued in U.S. Appl. No. 17/133,133", dated Oct. 4, 2022, 12 Pages.

"International Search Report & Written Opinion issued in PCT Application No. PCT/US22/022976", dated Jul. 13, 2022, 10 Pages.

"Notice of Allowance Issued in U.S. Appl. No. 17/191,630", dated Jan. 30, 2023, 12 Pages.

"Non Final Office Action Issued in U.S. Appl. No. 17/233,882", dated Jan. 17, 2023, 17 Pages.

"Final Office Action Issued in U.S. Appl. No. 17/233,882", dated Apr. 28, 2023, 19 Pages.

* cited by examiner

HINGED DEVICE

PRIORITY

This Patent Application is a non-provisional utility application claiming priority to corresponding U.S. Provisional Patent Application Ser. No. 63/060,459, filed Aug. 3, 2020, which is hereby incorporated by reference in its entirety.

BACKGROUND

Many computer form factors such as smart phones, tablets, and notebook computers can provide enhanced functionality by folding for storage and opening for use. For instance, the folded device is easier to carry and the opened device offers more input/output area. Many hinged designs have been tried. However, hinges that are durable while occupying minimal device real estate have been difficult to achieve. The present concepts relate to these and other aspects.

SUMMARY

The description relates to hinged computing devices. One example can include a device that can include a first portion and a second portion that are rotatably secured to a hinge assembly. The hinge assembly can define a first hinge axis that the first portion rotates around and a second hinge axis that the second portion rotates around. The hinge assembly can further include a first timing gear associated with the first portion and a second timing gear associated with the second portion. The first timing gear can rotate around a first timing axis that is parallel to and offset from the first hinge axis. The second timing gear can rotate around a second timing axis that is parallel to and offset from the second hinge axis. The first and second timing gears can directly intermesh with one another to synchronize rotation around the first hinge axis and the second hinge axis.

This example is intended to provide a summary of some of the described concepts and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Where space permits, elements and their associated reference numbers are both shown on the drawing page for the reader's convenience. Otherwise, only the reference numbers are shown. Note that some figures illustrate many elements and adding lead lines to all of the elements can diminish readability of the figure. Accordingly, not every element is designated in every figure. In some figures, where similar elements appear twice on the figure, such as on the left side and the right side, some elements are labeled on one side, but not both sides to avoid clutter on the drawing page.

DESCRIPTION

The present concepts relate to devices, such as computing devices employing hinge assemblies that can rotationally secure first and second device portions relative to first and second hinge axes. Timing arms can synchronize rotation around the first and second hinge axes. The timing arms can also convey a pop-up force to the first and second portions at some orientations, such as at a zero-degree or closed orientation. Timing arms that can provide both the synchronizing function and the pop-up conveyance function can provide a simplified and/or more robust device while also occupying less device real estate than previous designs. These and other aspects are described below.

Figure 1:
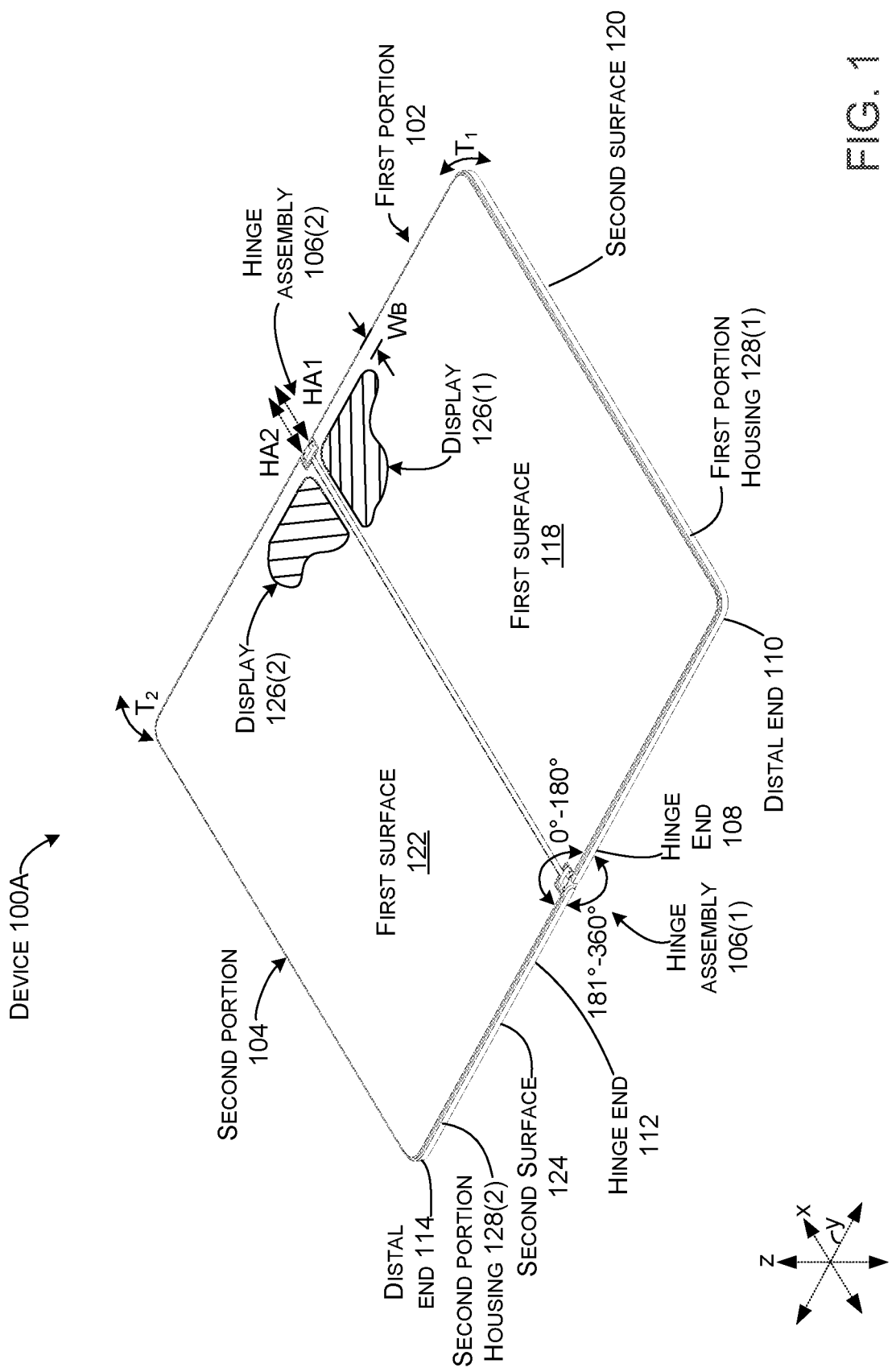
FIGS. 1, 2A-2E, 3A, 3B, 4A, 5A, 6A-6F, 7A, 8C, and 8D show perspective views of example devices in accordance with some implementations of the present concepts.

Introductory FIG. 1 shows an example device 100A that has first and second portions 102 and 104 that are rotatably secured together by hinge assemblies 106. (The use of a suffix e.g., 'A' with the designator 100 is intended to indicate that elements of the various described devices may be the same or different). In the illustrated implementation, two hinge assemblies 106(1) and 106(2) are employed, but other implementations could employ a single hinge assembly or more than two hinge assemblies.

The first portion 102 can extend from a hinge end 108 to a distal end 110. The second portion 104 also can extend from a hinge end 112 to a distal end 114. The hinge assemblies 106 can define two hinge axes HA. The first portion 102 can rotate around first hinge axis HA1 and the second portion 104 can rotate around second hinge axis HA2. The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view, but are shown and designated in subsequent FIGS.).

In some implementations, displays 126 are supported by housing 128. For example, the displays 126 can be positioned on the first and/or second surfaces 118, 120, 122, and/or 124, respectively. In the illustrated configuration, the displays 126 are positioned on first surfaces 118 and 122, respectively. Note that the configuration of the hinge assemblies 106 can affect the extent to which the displays 126 can cover the surfaces, such as first surfaces 118 and 122. For instance, the configuration of the hinge assemblies 106 can affect a bezel width WB where the displays do not cover the surfaces. This aspect will be discussed below.

Figure 2A:
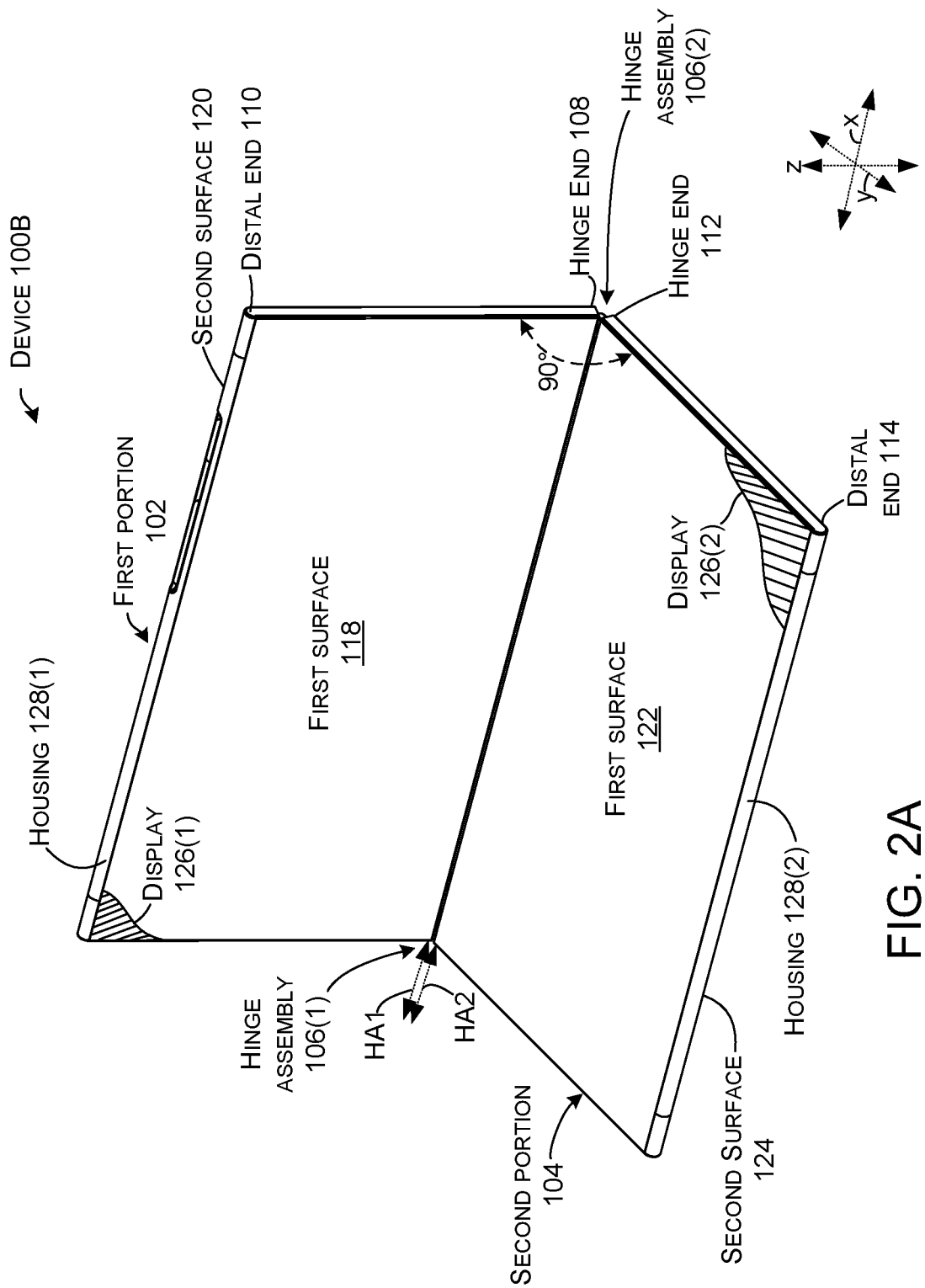
Figure 2B:
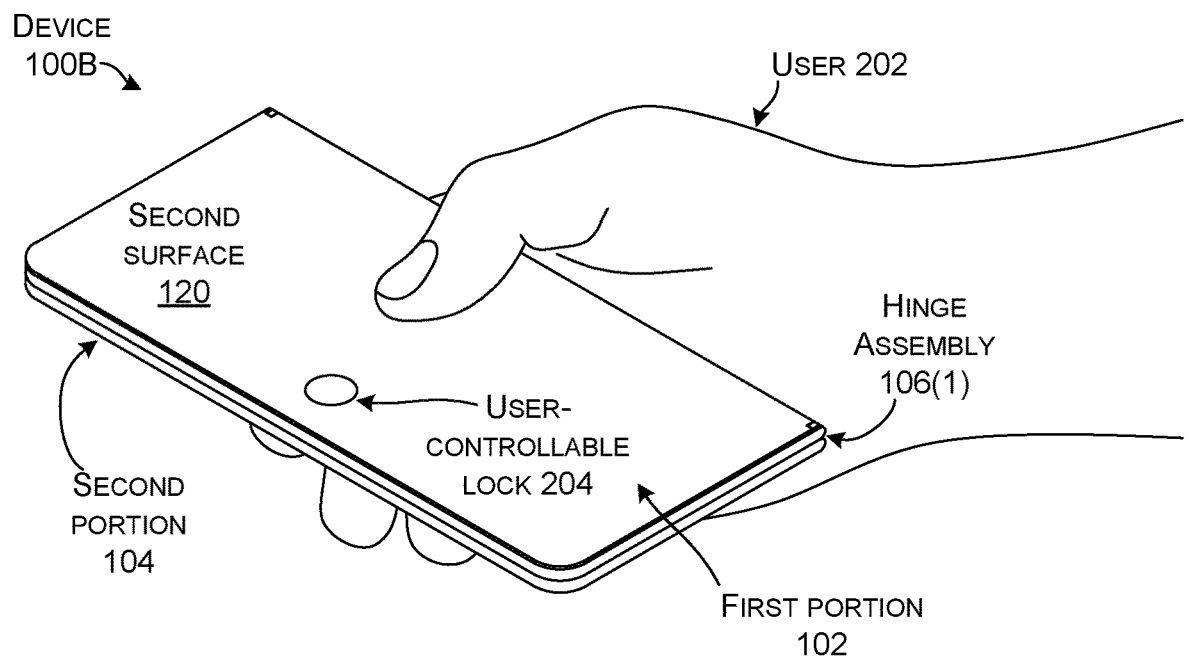

FIGS. 2A-2E collectively show another device 100B and a feature provided by this device. FIG. 2A shows device 100B in an open configuration of about 90 degrees where the user can see and/or engage displays 126. FIG. 2B shows the device 100B in the closed orientation where the first and second portions 102 and 104 are positioned parallel to and against one another. The closed orientation can be very compact and easy for the user 202 to transport. For instance, the device may fit in the user's pocket. Further, the first surfaces can be protected in this closed orientation by the second surfaces (e.g., by the housing).

In this implementation, device 100B can also feature a user-controllable lock 204. The user-controllable lock 204 can function to maintain the first and second portions 102 and 104 in the closed orientation unless released by the user 202. In this example, the hinge assemblies 106 also include a pop-up feature that biases the first and second portions 102 and 104 away from each other from the closed orientation when the lock is released. The pop-up feature is described in more detail below. Briefly, the pop-up feature can provide a technical benefit of allowing a user to open a device with a single hand, where otherwise both hands would likely be required.

Figure 2C:
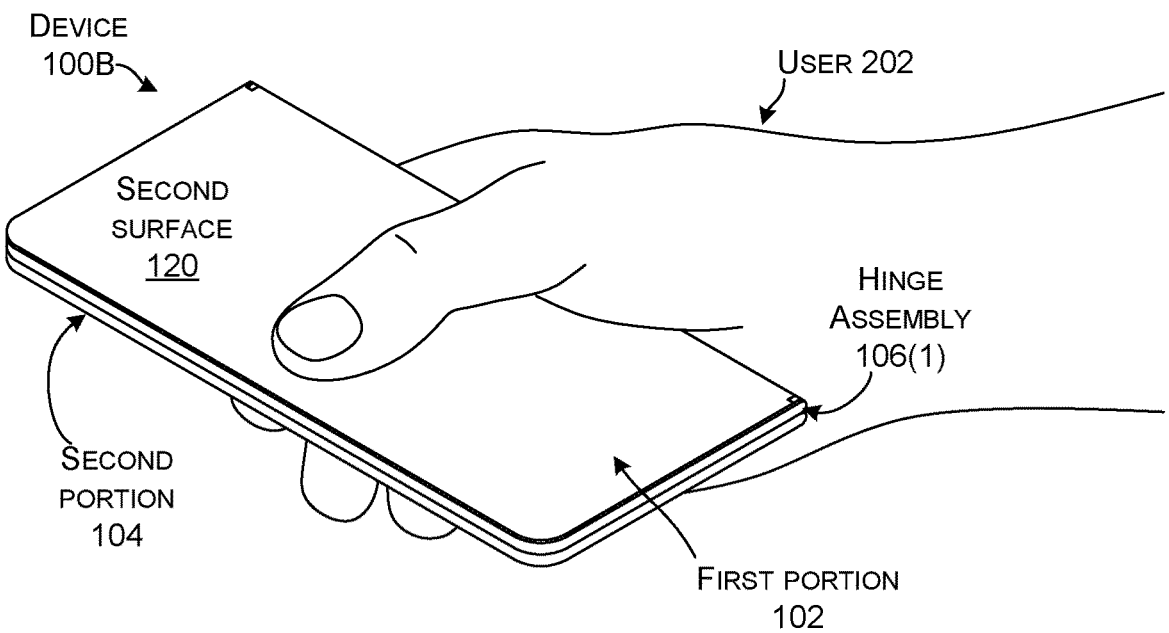

Assume that as shown in FIGS. 2B and 2C the user 202 wants to open the device 100B. For instance, the user may want to return to an open orientation, such as shown in FIG. 2A. As shown in FIGS. 2B and 2C, to open the device 100B the user 202 can simply engage the user-controllable lock 204. In this implementation, the user can engage the user-controllable lock with a single digit (in the illustration his/her thumb) to activate the user-controllable lock and release the first and second portions 102 and 104.

Figure 2D:
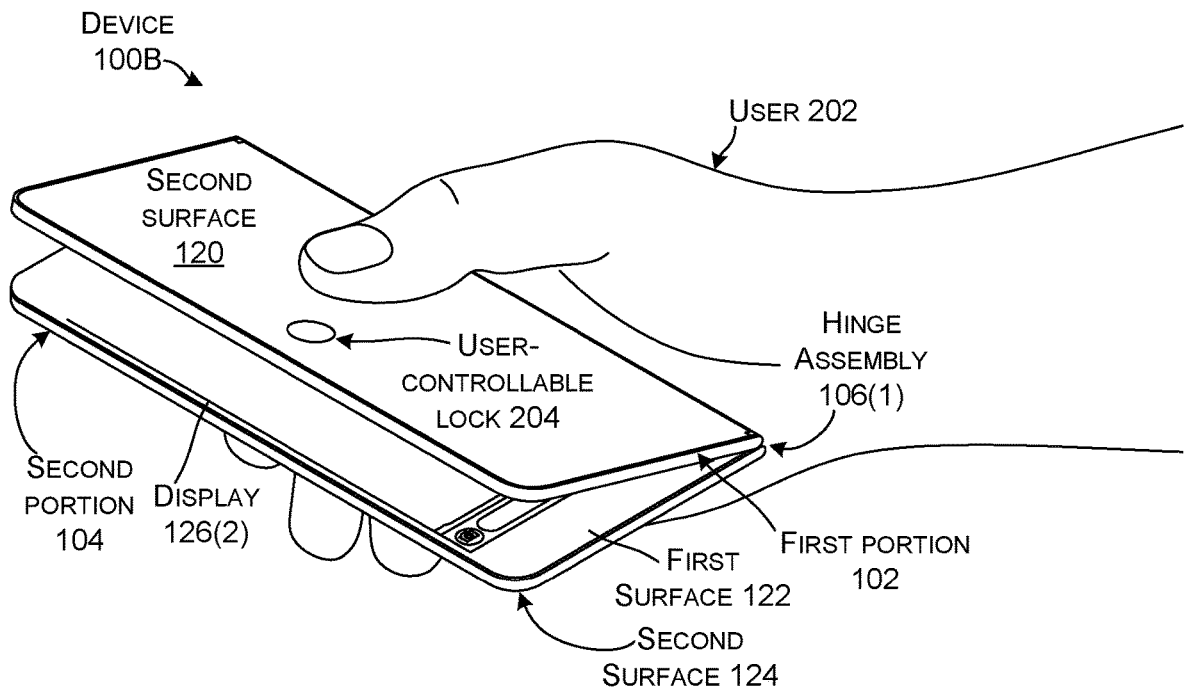

As shown in FIG. 2D, responsive to the user 202 releasing the user-controllable lock 204, the device 100B can automatically open the first and second portions 102 and 104 a few degrees without further user effort. In this case, the hinge assemblies 106 provide a force that biases the first and second portions apart from the closed orientation unless the user-controllable lock 204 maintains the closed orientation. This bias can be viewed as a 'pop-up' feature. Further, once the device 100B is popped-up, the device can maintain the orientation without user intervention (e.g., the user doesn't have to hold the device open).

Figure 2E:
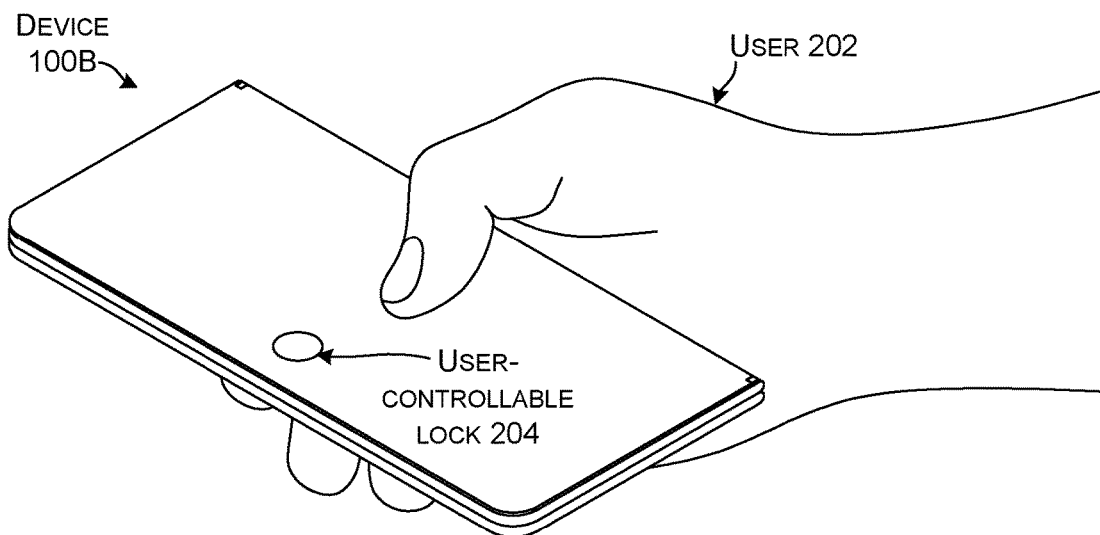

The pop-up feature can allow the user 202 to easily manually open the portions 102 and 104 further if desired, such as to view the displays 126. When the user is done, he/she can close the device 100B simply by pressing down with his/her thumb until the device is closed, and the user-controllable lock 204 can re-engage as shown in FIG. 2E.

Note that the illustrated implementation employs the user-controllable lock 204 on the second surface 120, but other locations are contemplated.

FIGS. 3A-8H collectively illustrate several example implementations of the present concepts.

Figure 3A:
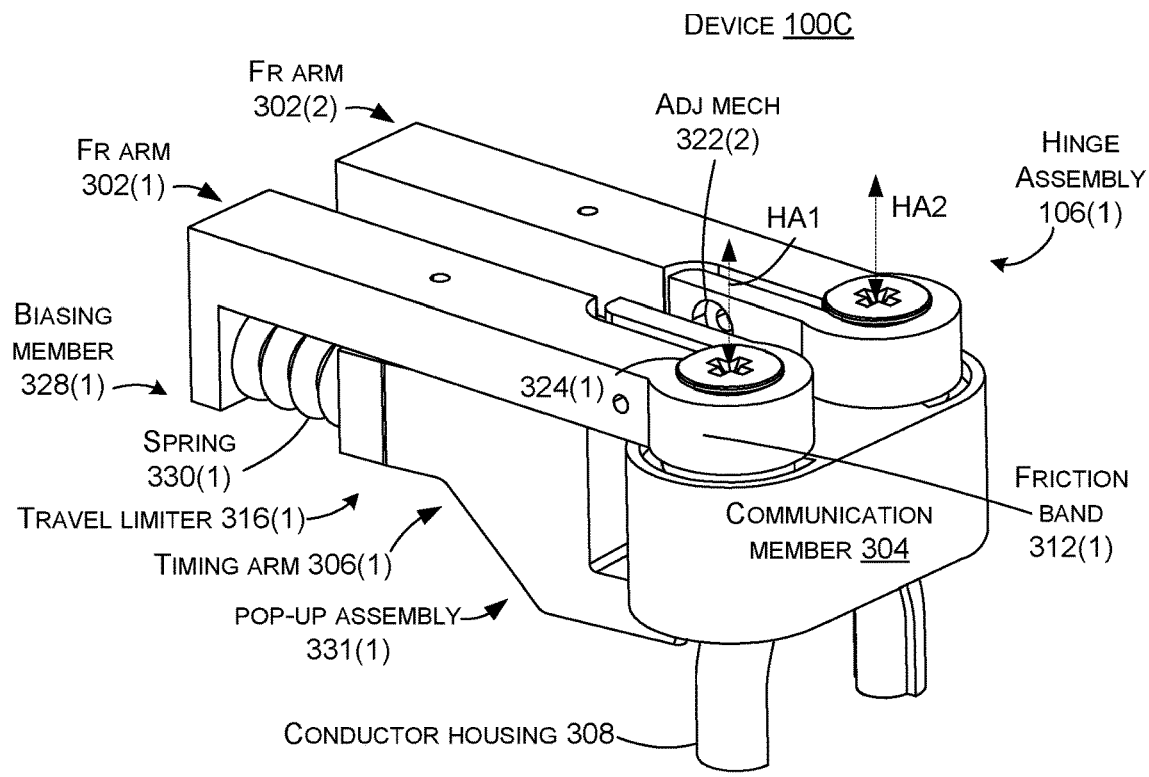
Figure 3B:
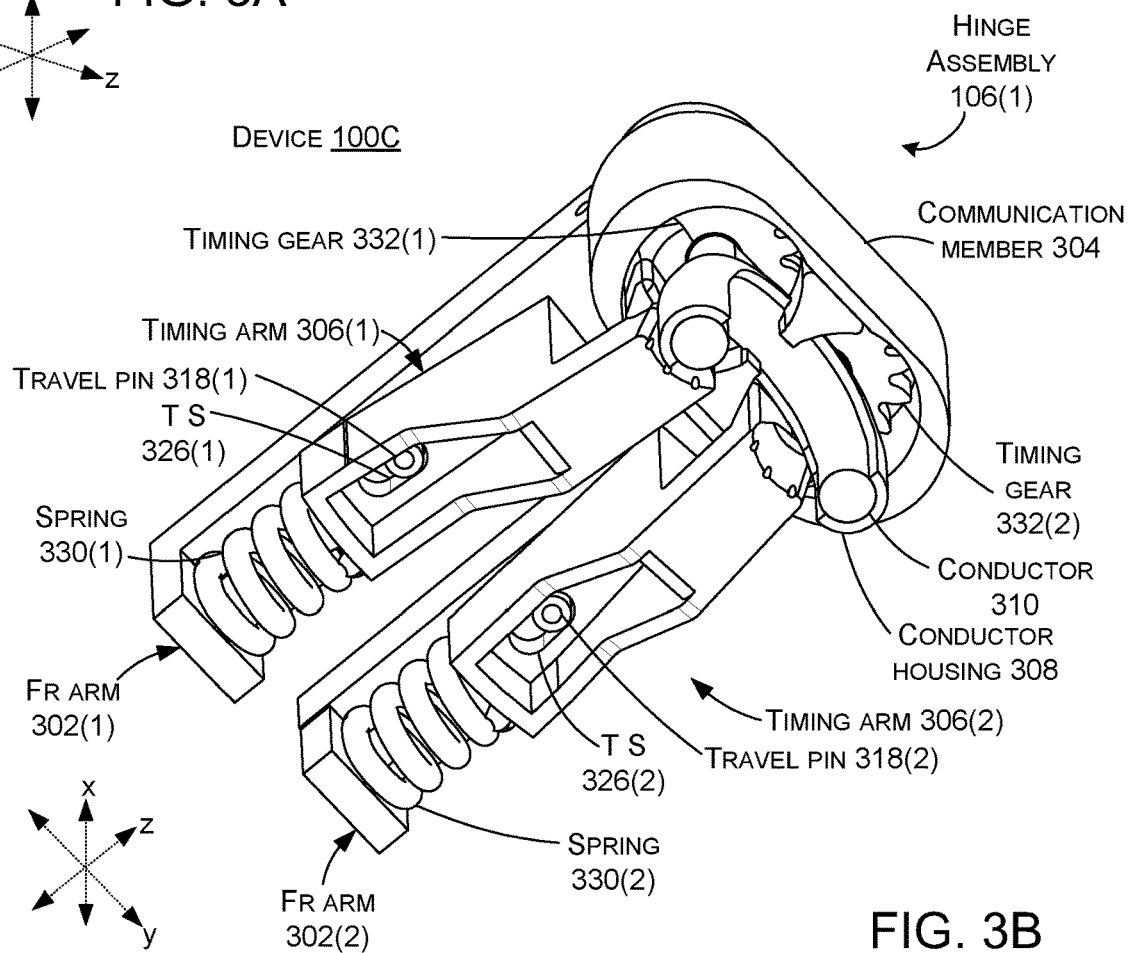
Figure 3C:
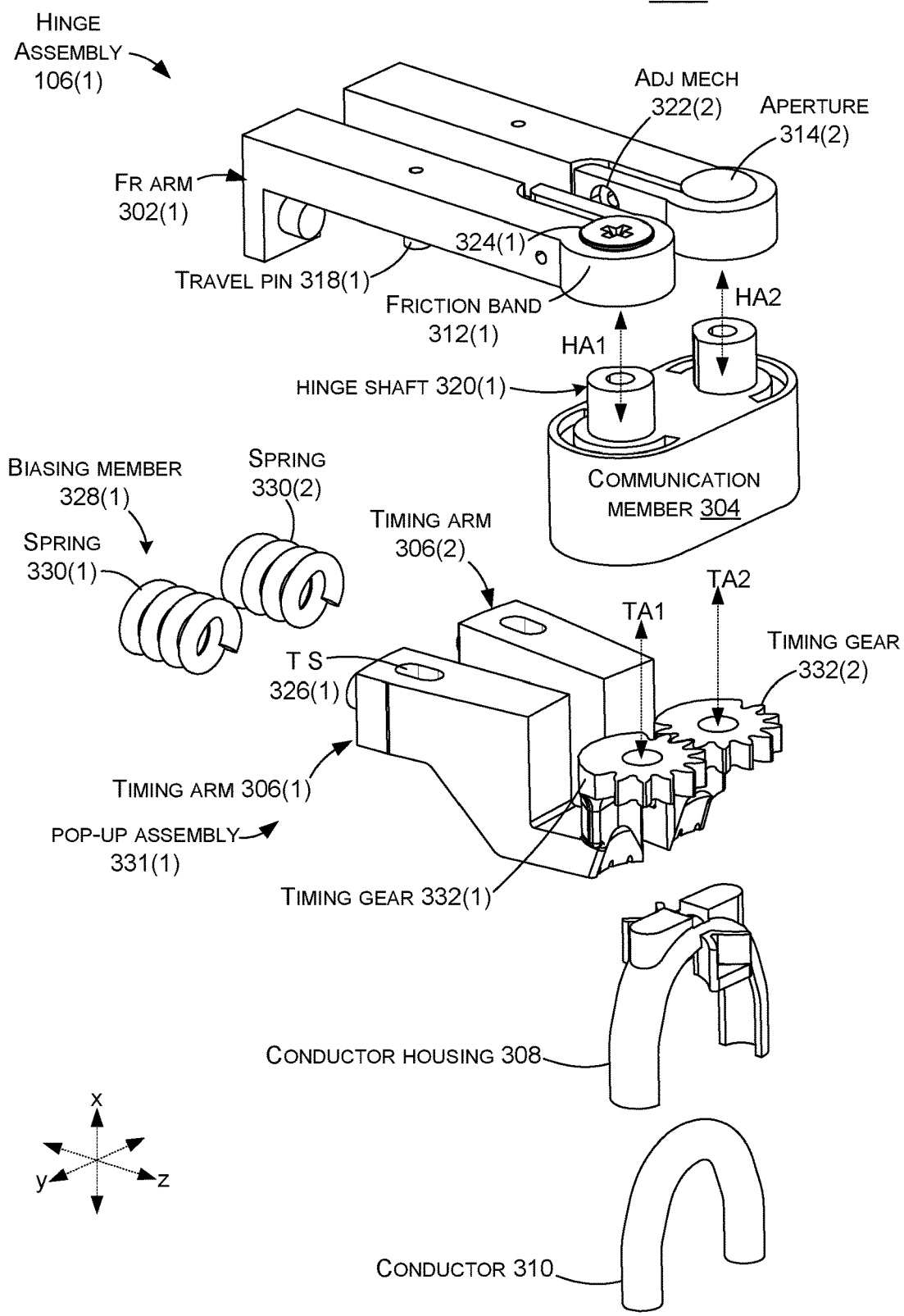
FIGS. 3C, 4C, 4D, 5B, 6G, 6H, 7C, and 8E show exploded perspective views of example devices in accordance with some implementations of the present concepts.
Figure 3D:
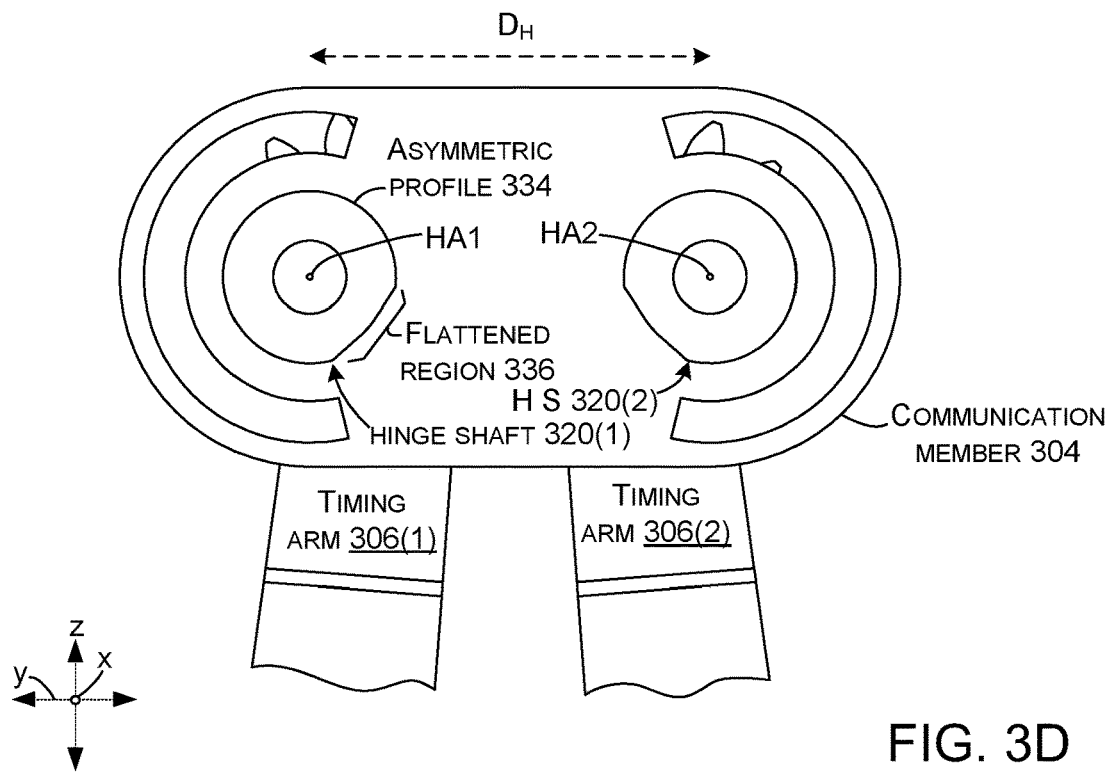
FIGS. 3D, 3E, 4B, 5C, 5D, 6I-6M, 7B, 7D, 7F, 8A, 8B, 8F, and 8G show elevational views of example devices in accordance with some implementations of the present concepts.
Figure 3E:
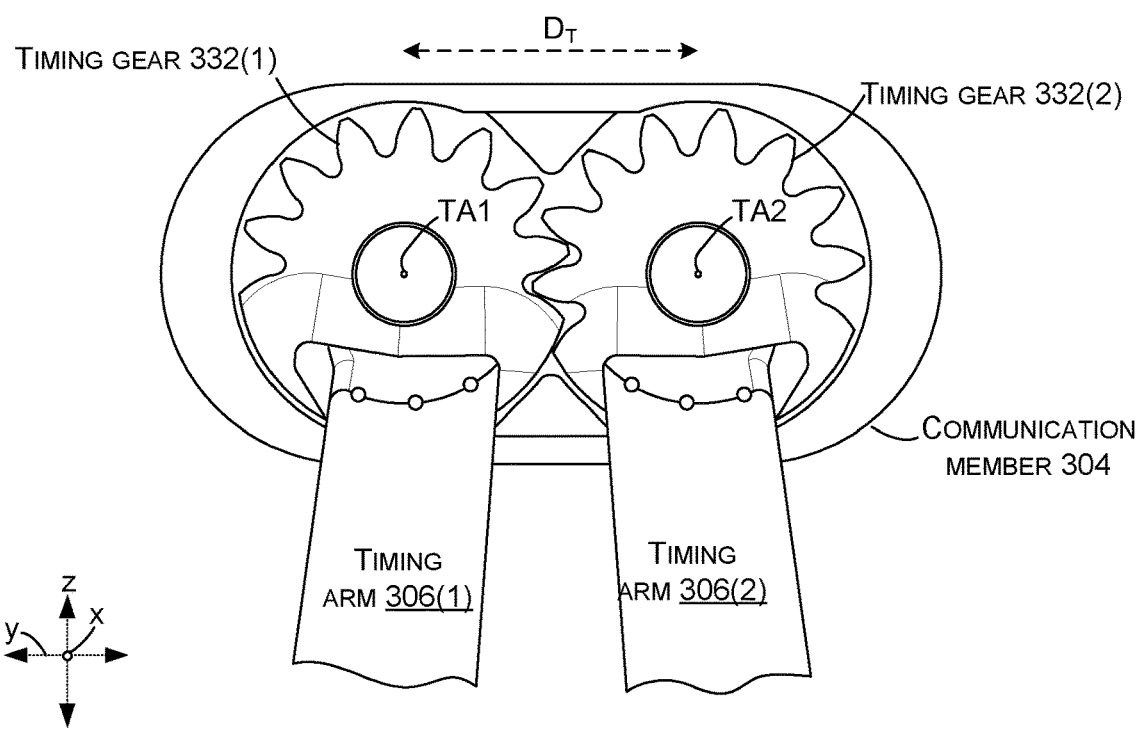

FIGS. 3A-3C collectively show details of example device 100C including hinge assembly 106(1). FIG. 3A is a perspective view from 'above' the hinge assembly and FIG. 3B is a perspective view from 'below' the hinge assembly. FIG. 3C is an exploded perspective view that is similar to FIG. 3A. FIGS. 3D and 3E are elevational views showing various features of the hinge assembly.

In this case, as shown in FIG. 3C the hinge assembly 106(1) includes friction arms 302, communication member 304, timing arms 306, and a conductor housing 308 for routing a conductor 310 through the hinge assembly 106(1). The friction arms 302 can include adjustable friction bands 312 that define apertures 314. The friction arms 302 can also relate to travel limiters 316. In this case, the travel limiters 316 include travel or timing pins 318 defined by the friction arms 302.

The communication member 304 can define hinge shafts 320. The hinge shafts 320 can be coextensive with the hinge axes HA. The hinge shafts 320 can be received in the apertures 314. The hinge shafts 320 can have an external dimension (e.g., width) measured transverse the hinge axes that is friction fit by an internal dimension (e.g., width) of the apertures 314. The width of the apertures 314 can be adjusted by an adjustment mechanism 322 that can compress the friction band 312 to reduce the apertures 314. For instance, a threaded fastener that extends through one side of the friction bands 312 and is threadably received in the other side can be adjusted to compress or relax the friction bands to adjust the rotational friction around the hinge axes.

The friction bands 312 can be retained on the hinge shafts 320 by fasteners 324. Note that in FIG. 3C, the fastener 324(1) is shown and fastener 324(2) is removed to expose aperture 314(2). Friction between the hinge shafts 320 and the friction bands 312 can provide a resistance to rotation of the first and second portions around the hinge axes HA. For instance, some device designs may specify sufficient resistance to rotation so that the device maintains an orientation that the user adjusts it to (e.g., if the user rotates the first and second portions to 90 degrees, the device maintains that orientation until the user changes it). Friction between the hinge shafts 320 and the friction bands 312 can provide this resistance to rotation.

The timing arms 306 can define timing or travel slots 326 that receive travel pins 318 to collectively function as the travel limiters 316. Note that the travel limiters 316 can limit or define movement relative to multiple axes. For instance, the travel limiters 316 can allow linear movement of the timing arms 306 relative to the friction arm 302 (and hence the first and second portions). The extent of this linear movement can be defined by the length of the travel slots 326. Simultaneously, the travel limiters 316 can provide an angular constraint on relative rotation between the timing arms 306 and the friction arms 302. For instance, the outside diameter of the travel pins 318 can be essentially the same dimension as the inside diameter of the travel slots 326 (with enough clearance to allow relative movement) to define angular rotation of the timing arms 306 relative to the friction arms 302. Thus, from one perspective, the combination of the travel pins 318 and travel slots 326 can allow relative linear movement between the friction arms 302 and the timing arms 306 (e.g., sliding) while also defining a range of relative axial or rotational movement (e.g., limiting them to rotating together rather than separately). Such an example is described relative to FIGS. 6K-6M.

In the illustrated configuration, timing arms 306 define travel slots 326 and friction arms 302 define travel pins 318. In other implementations, the timing arms 306 can define the travel pins 318 and friction arms 302 can define travel slots 326.

Biasing members 328, such as springs 330 can bias the timing arms 306 toward the hinge assembly 106 and/or the friction arms 302 away from the hinge assembly. The timing arms 306 can convey this force to the hinge assembly 106 to create a pop-up force from the closed orientation to an open orientation. In this case as evidenced in FIG. 3B, the springs 330 are compressed and captured between friction arms 302 and timing arms 306. From one perspective, the biasing members 328 and the timing arms 306 can entail pop-up assemblies 331 that provide the pop-up functionality.

The timing arms 306 can also define timing gears 332. In this case, the timing gears 332 directly intermesh with one another without intervening gears. The timing gears 332 can synchronize rotation (e.g., extent of rotation) of the first and second portions 102 and 104 around the first and second hinge axes HA1 and HA2. For instance, the timing gears 332 can ensure that 20 degrees of rotation of the first portion 102 around the first hinge axis HA1 simultaneously produces 20 degrees of rotation of the second portion 104 around the second hinge axis HA2. In this implementation, the timing gears 332 can rotate relative to timing axes TA. In this case, the timing axes TA can be parallel to, but not co-extensive with, the hinge axes HA. Stated another way, the timing axes can be offset from the hinge axes in one or two directions (e.g., in the yz reference plane).

As mentioned above, the timing arms 306 can synchronize rotation around the two hinge axes and convey biasing energy to create pop-up force for the first and second portions (102 and 104, FIG. 1) at specific orientations, such as the zero-degree orientation. As such, the timing arm 306 can be viewed as a single integrated element that can provide both a synchronizing function and a pop-up function. Utilizing a single element can provide a more robust and reliable design with less backlash and can be more compact than previous designs.

The friction arms 302 can be secured to the first and second portions (102 and 104, FIG. 1). In turn, the friction arms 302 can cause the first and second portions to rotate on hinge shafts 320 around hinge axes HA1 and HA2, respectively. In contrast, the timing arms' timing gears 332 can rotate around the timing axes TA1 and TA2. Further, the timing arms 306 can travel linearly relative to the first and second portions during rotation. The extent of the travel can be defined as the length of the travel slots 326 minus the diameter of the travel pins 318.

As shown in FIGS. 3D and 3E, this relative linear movement between the timing arms 306 and the first and second portions can allow or be enabled by the timing axes TA being offset from the hinge axes HA. This offset and relative movement can allow the timing gears 332 to be contained entirely within the communication member 304. Further, the timing gears 332 can directly engage one another and thus eliminate intervening secondary gears which can be subject to breakage and/or create undesired play between the first and second portions. In this implementation, the offset is in the y reference direction. For instance, note that the distance $D_H$ between the hinge axes HA is greater than the distance $D_T$ between the timing axes TA. In this case, the hinge axes and the timing axes are arranged along a line parallel to the y reference axis (e.g., no z reference direction offset). FIGS. 6A-6F show another implementation where the timing axes remain parallel to the hinge axes but are offset in both the x and z reference directions.

Recall that friction between the hinge shafts 320 and the friction bands 312 can create the resistance to rotation to maintain a desired device orientation. However, such resistance to rotation can diminish (e.g., counteract) the pop-up force. Thus, at orientations where pop-up force is generated, rotational friction can be decreased. This aspect can be accomplished utilizing various techniques. In some cases, such as shown in FIG. 3D, the hinge shafts 320 can have an asymmetric profile 334. In this case, the asymmetric profile can include a flattened region 336 that would contact a corresponding flattened area of the friction bands 312 around the zero-degree orientation, such as at a range from 0-30 degrees for instance. By flattening these regions, friction between the friction bands 312 and the hinge shafts 320 can be diminished during this sub-range of rotation. This aspect can provide the technical solution of providing more effective use of the pop-up force stored in the springs or other biasing elements.

Figure 4A:
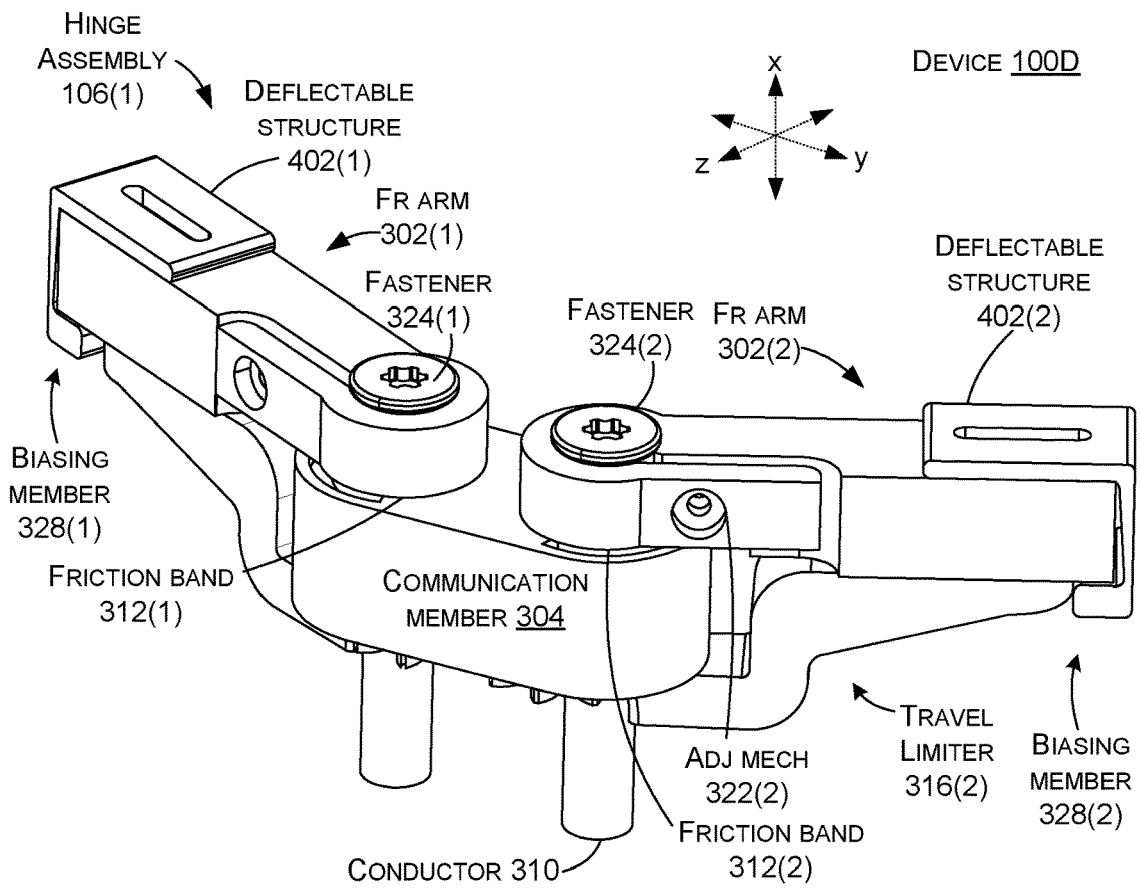
Figure 4B:
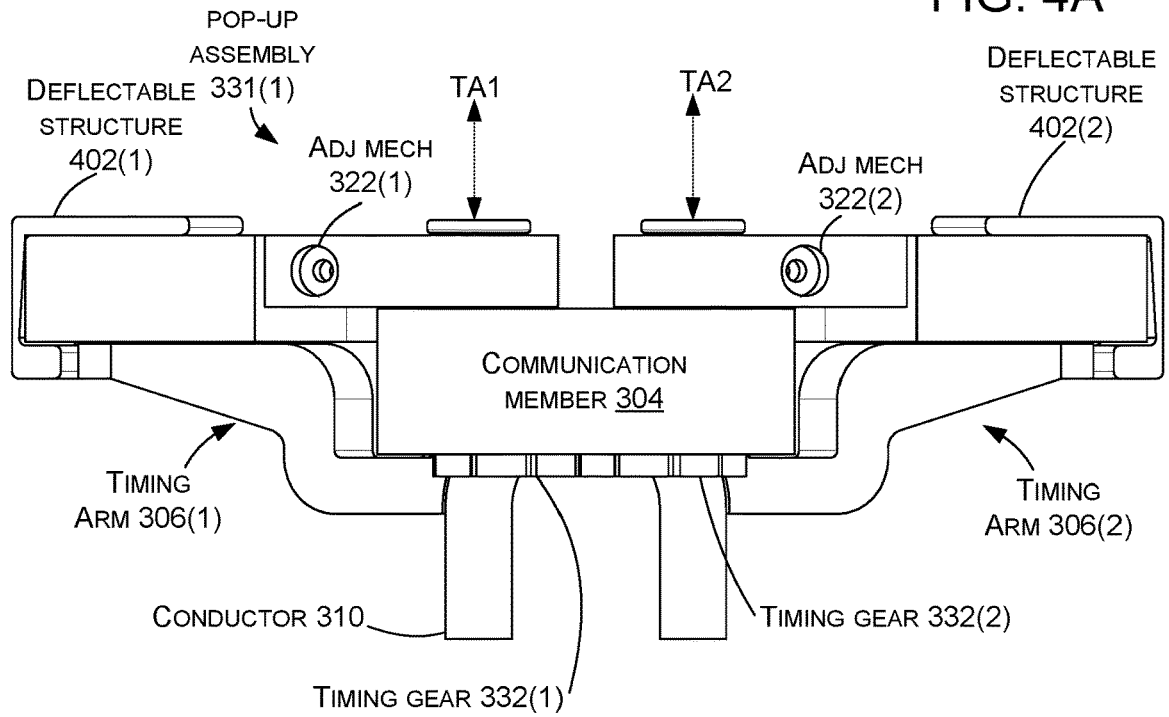
Figure 4C:
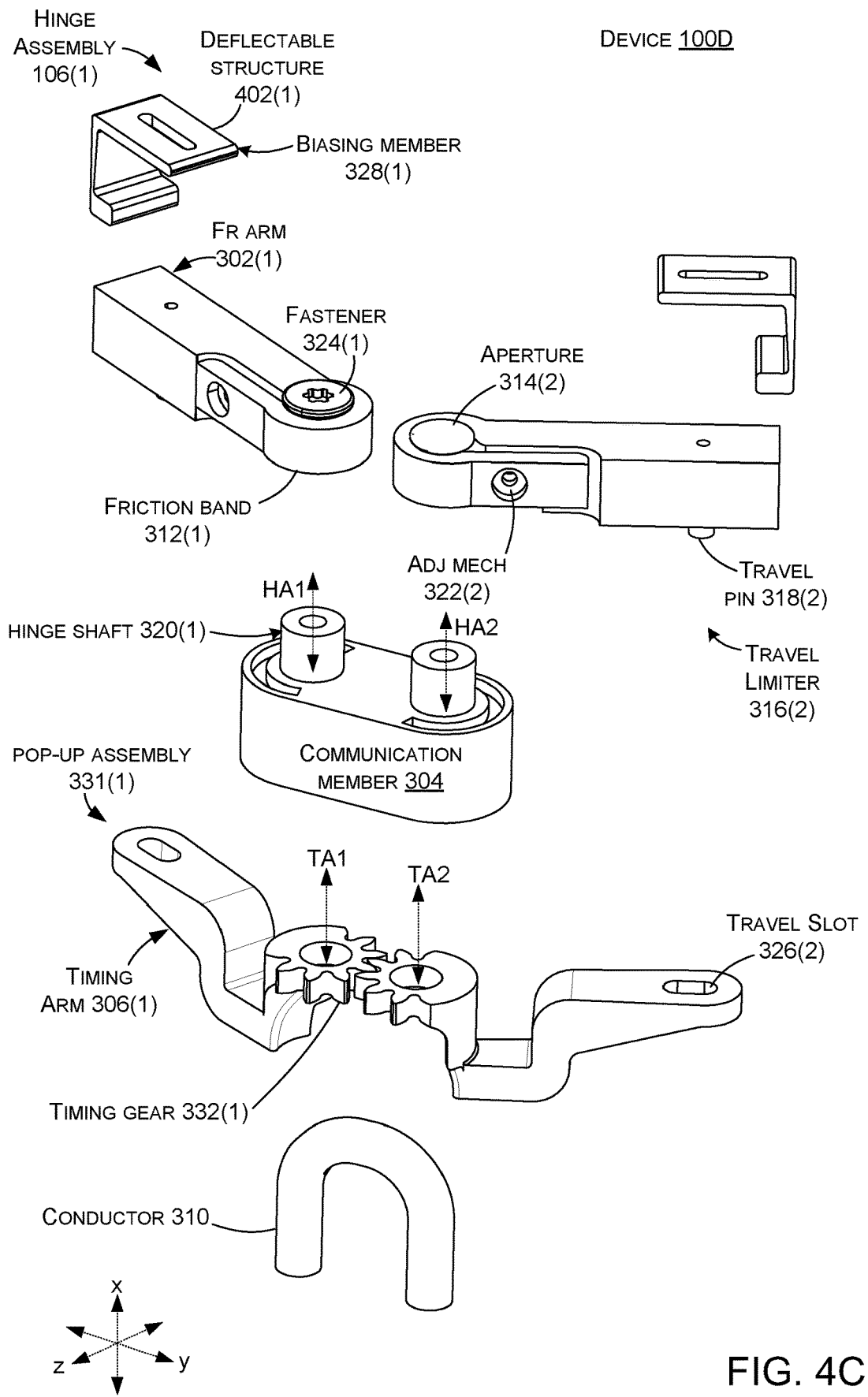
Figure 4D:
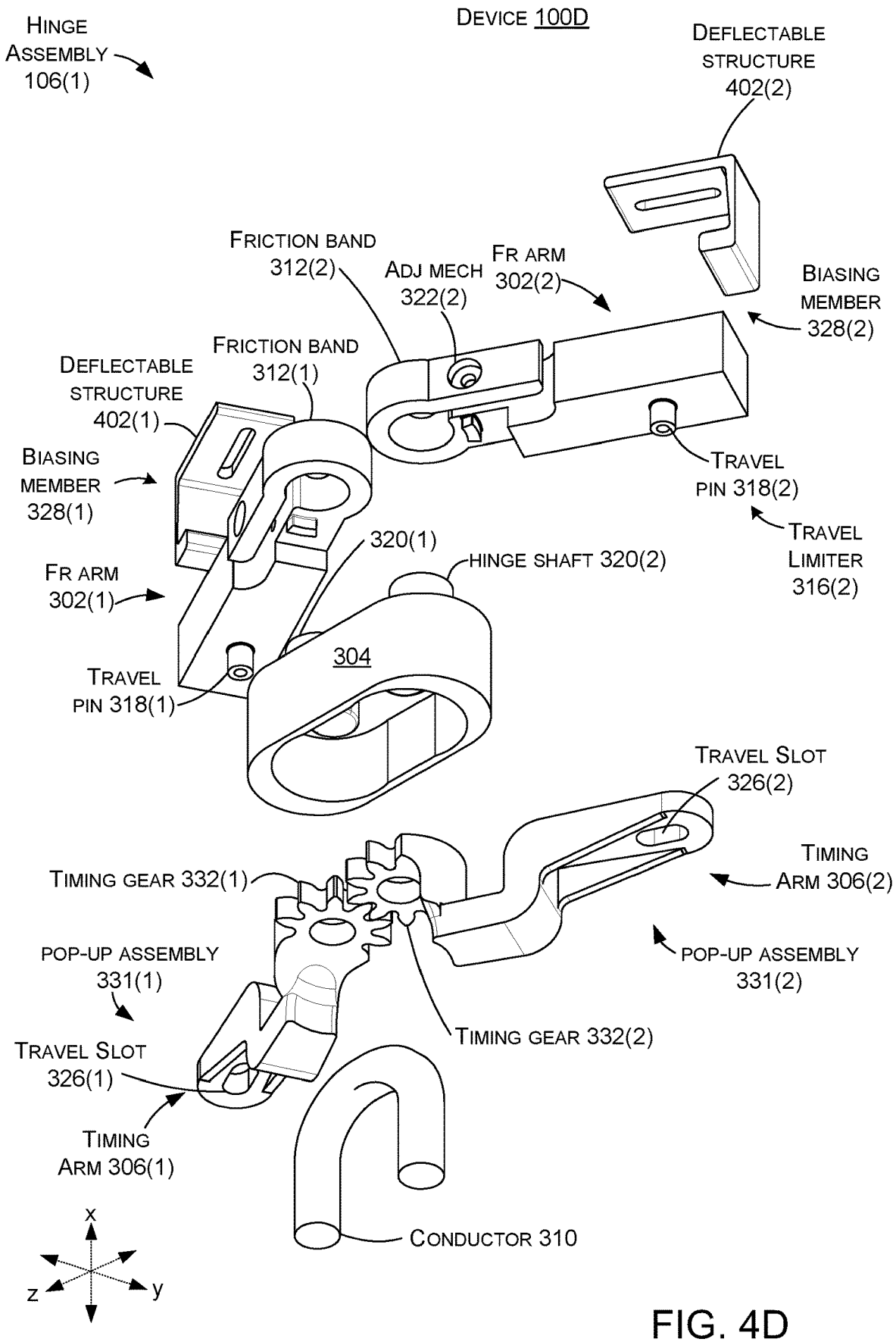

FIGS. 4A-4D collectively show details of another example device 100D including hinge assembly 106(1). FIG. 4A is a perspective view from 'above' the hinge assembly with the device in about a 140-degree orientation. FIG. 4B is a front elevational view of the hinge assembly in a 180-degree orientation. FIG. 4C is an exploded perspective view that is similar to FIG. 4A. FIG. 4D is an exploded perspective view from 'under' the hinge assembly 106(1) at a similar orientation to FIG. 4C.

In this case, as can be seen in FIGS. 4C and 4D, the biasing members 328 are manifest as deflectable structures 402. The deflectable structures 402 can impart a bias on the timing arms 306 toward the timing axes TA. During rotation at specific orientations (e.g., where pop-up is desired), the bias can be overcome and the timing arms 306 can deflect the deflectable structures 402 away from the timing axes. The deflection of the deflectable structures 402 stores energy. This stored energy can act as the pop-up energy that can provide a force between the timing arms 306 and the friction arms 302 that results in the pop-up force. At other orientations, such as from 30 degrees to 360 degrees for example, the timing arms 306 are not forced against the deflectable structures 402 and the deflectable structures remain in a resting position (e.g., not deflected).

In this case, the timing arms 306 have a U-shaped (flat or curved bottom) or rectangular shaped configuration when viewed along a plane that is parallel to the timing axis and passes through the travel slot 326. This configuration can allow the timing gears 332 to be contained within the communication member 304 while increasing the amount of the device that can be covered by the displays (e.g., reducing bezel). This can be achieved by the 'U' shape of the timing arms 306 receiving the communication member 304. This greater display coverage can be achieved despite the timing arms 306 extending from the bottom (e.g., toward the center of the device) of the communication member 304 because the distal ends of the timing arms (e.g., the ends containing the travel slots) extend laterally from the communication member 304 rather than below it. FIGS. 5A-5D and 6A-6M show alternative configurations where the timing arms 306 are more linear and are positioned on the top (e.g., toward the outside of the device) relative to the communication member 304.

Figure 5A:
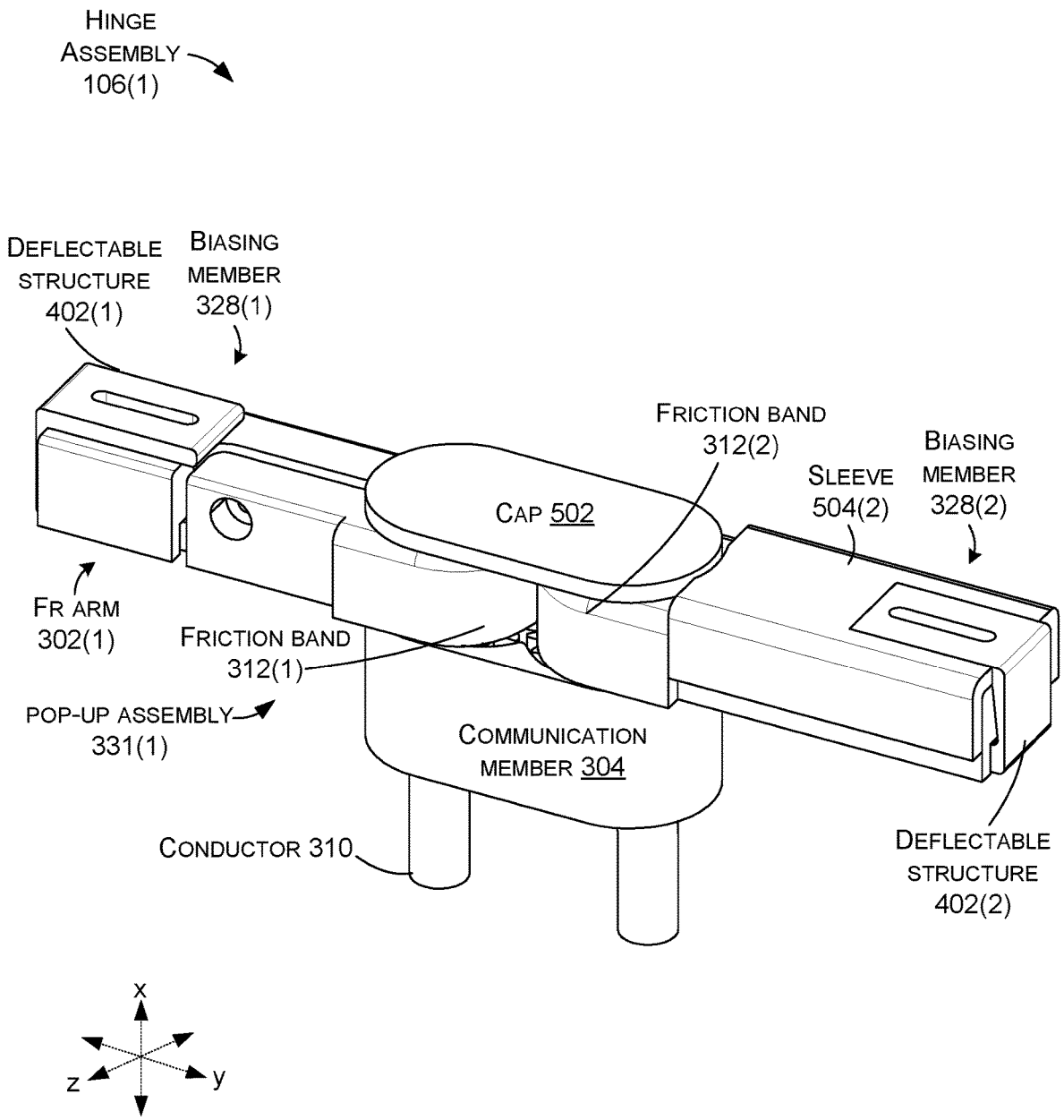
Figure 5B:
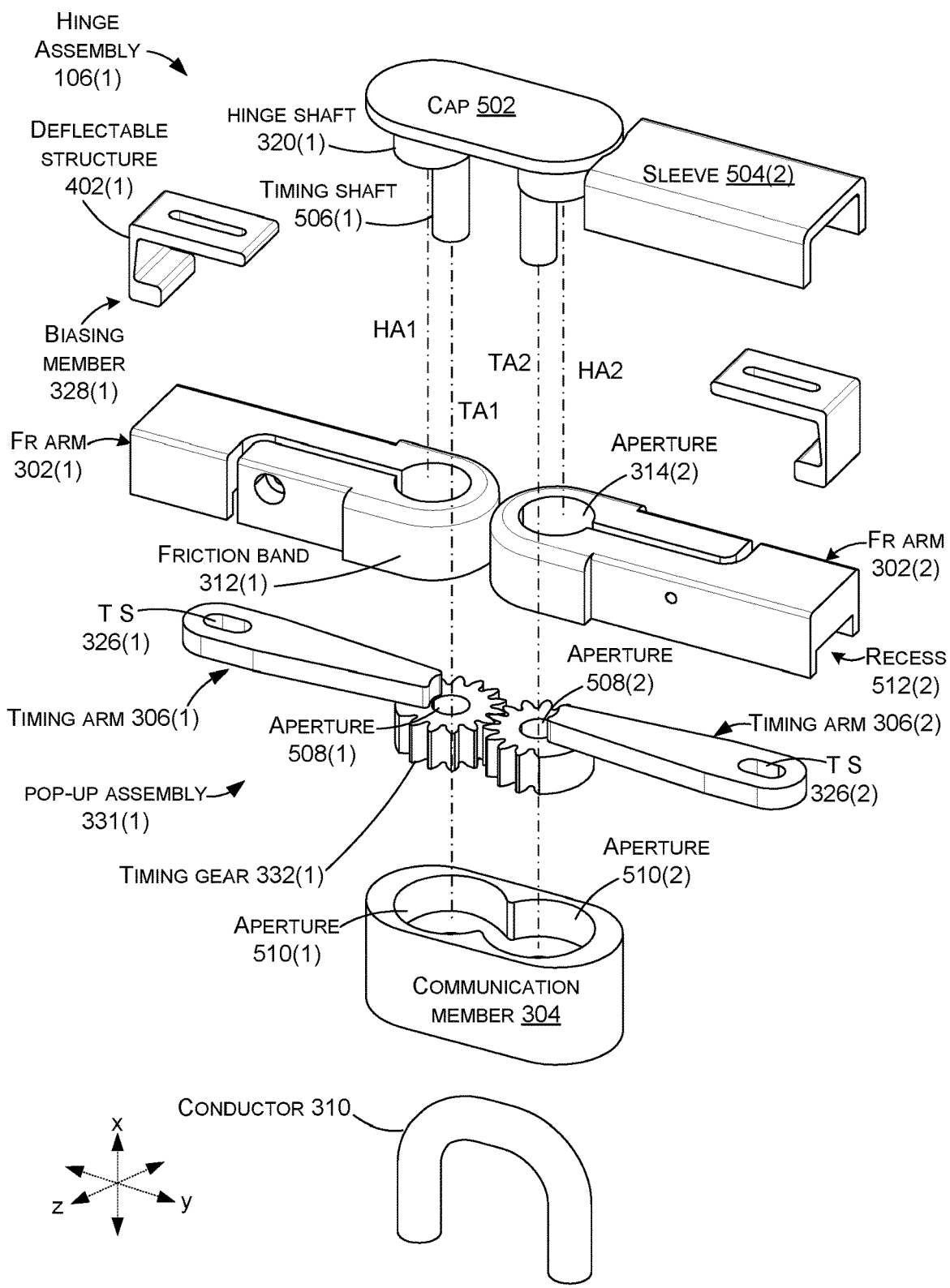
Figure 5C:
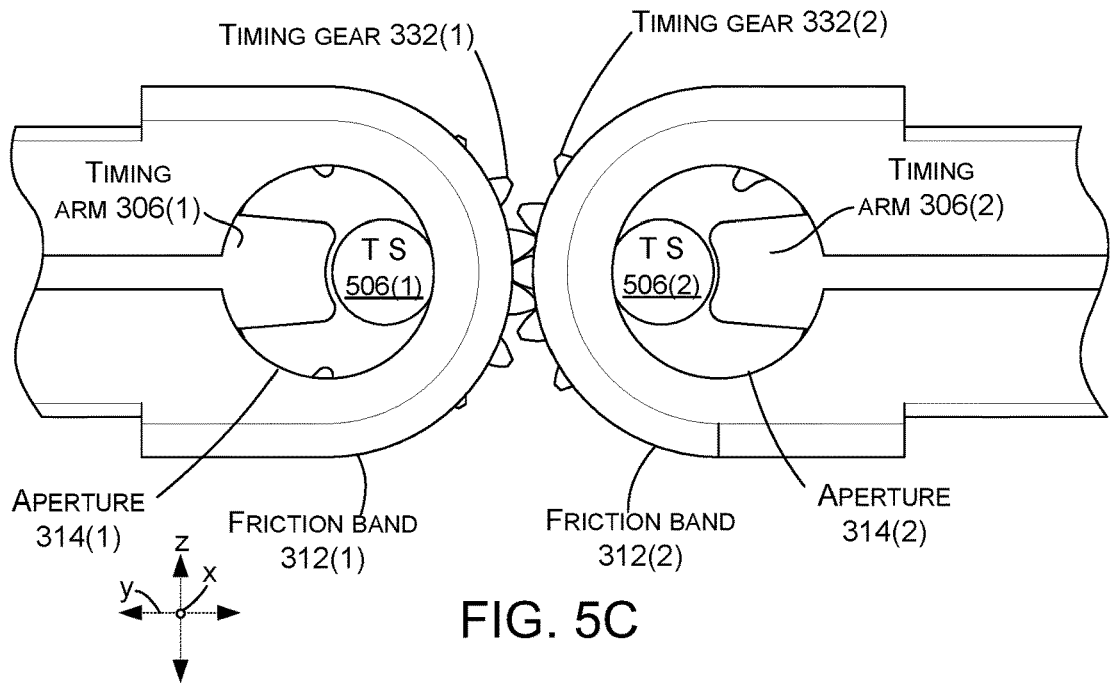
Figure 5D:
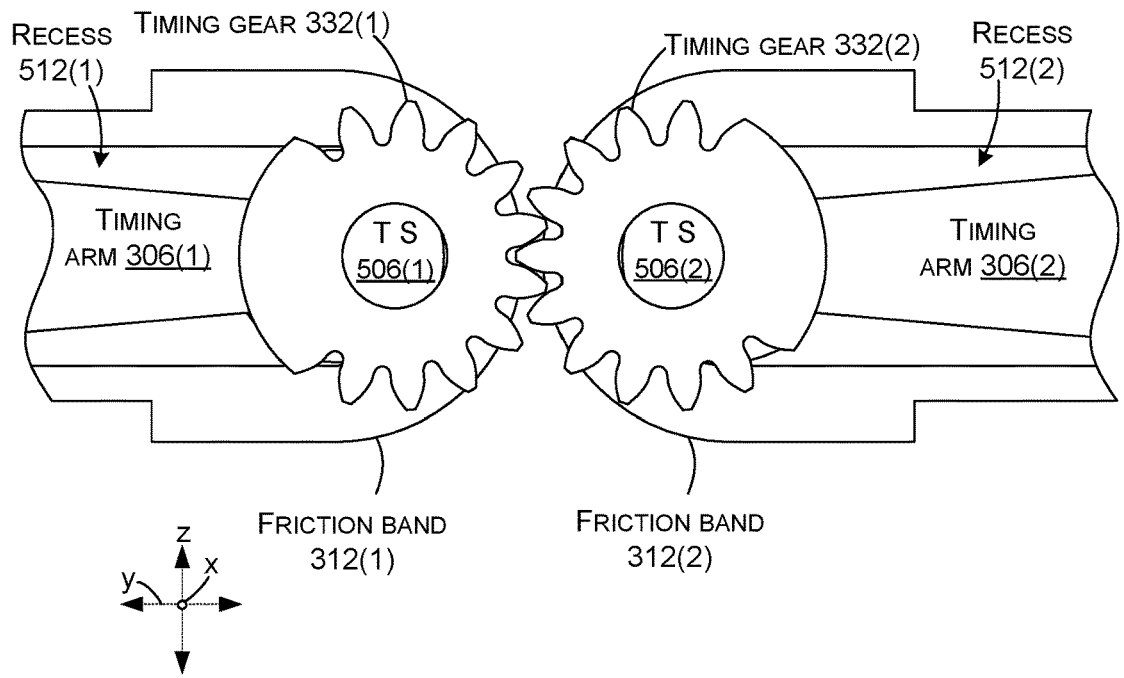

FIGS. 5A-5D collectively show another example device 100E that includes hinge assembly 106(1). FIG. 5A shows a perspective view of the device in a 180-degree orientation. FIG. 5B shows an exploded perspective that is similar to FIG. 5A. FIGS. 5C and 5D show elevational views looking down the x reference axis (e.g., down the hinge axes and timing axes) at the 180-degree orientation.

In this case, as can be seen in FIG. 5B, the hinge assembly 106(1) includes a cap 502 that interacts with the communication member 304. The hinge assembly also includes sleeves 504 that interact with friction arms 302. In this implementation, the cap 502 can define hinge shafts 320 and timing shafts 506. The hinge shafts 320 can be received in apertures 314. The timing shafts 506 can be received in apertures 508 defined by the timing gears 332. In turn, the timing gears 332 can be received in apertures 510 defined by the communication member 304.

The timing arms 306 can be received in sliding relation, and guided by, recesses 512 in the friction arms 302. Thus, when the friction arms 302 are secured to the first and second portions, the timing arms 306 are effectively in sliding relation to the first and second portions. This configuration can allow linear movement of the timing arms 306 relative to the friction arms 302 as the device is rotated through the range of rotation. This relative linear movement results because the timing arms 306 can rotate around the timing axes while the friction arms 302 rotate around the hinge axes.

Figure 6A:
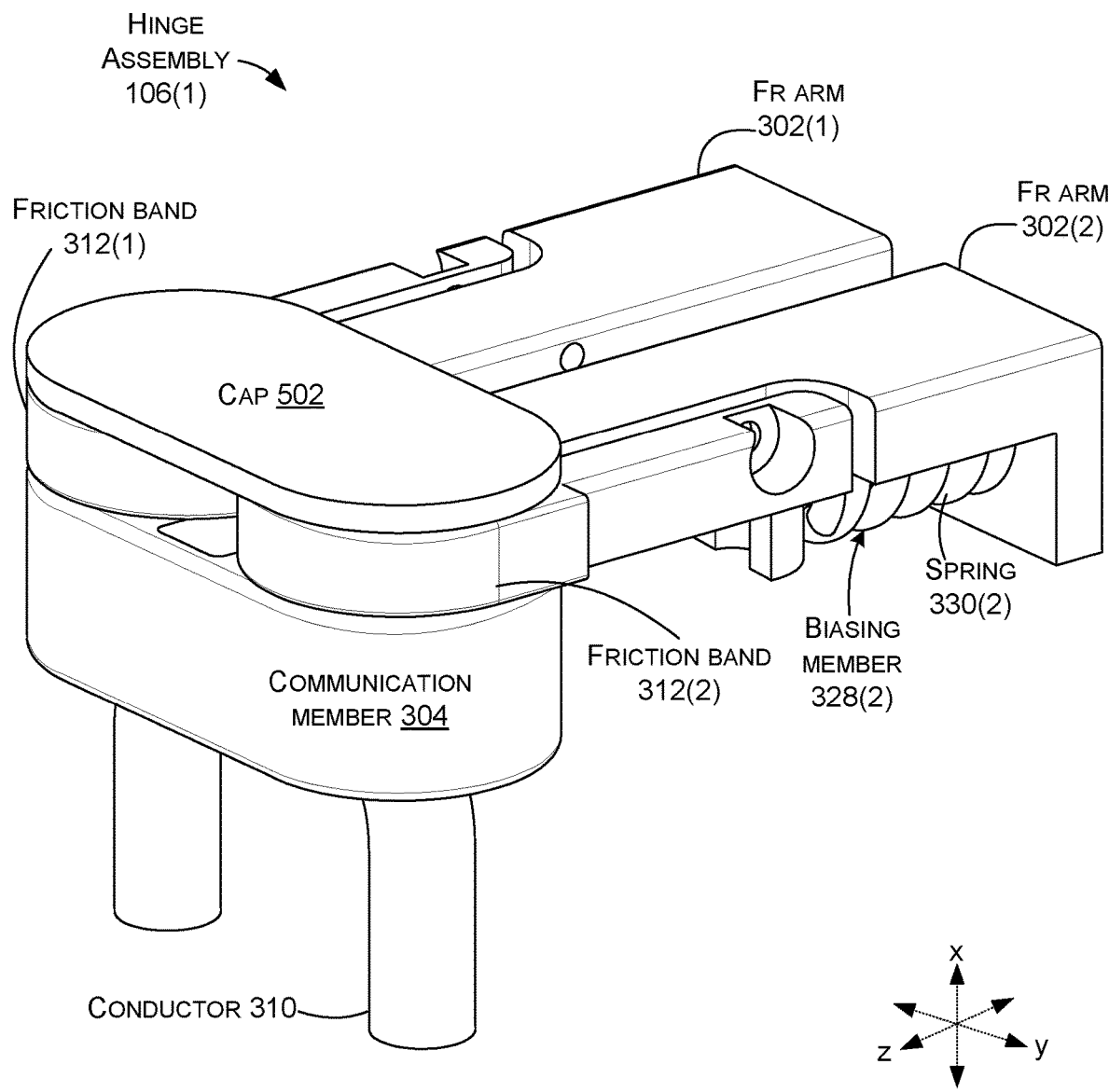
Figure 6B:
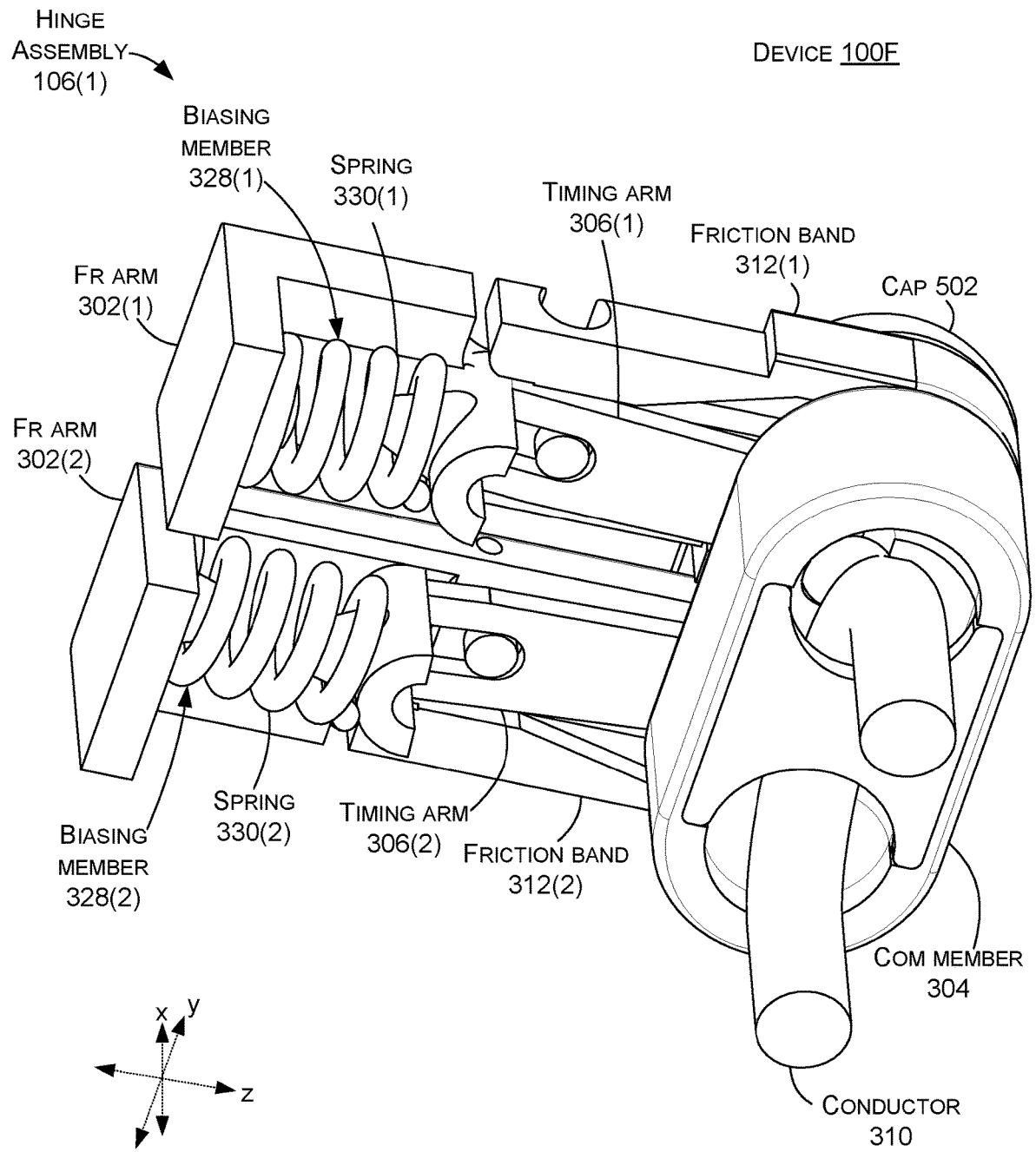
Figure 6C:
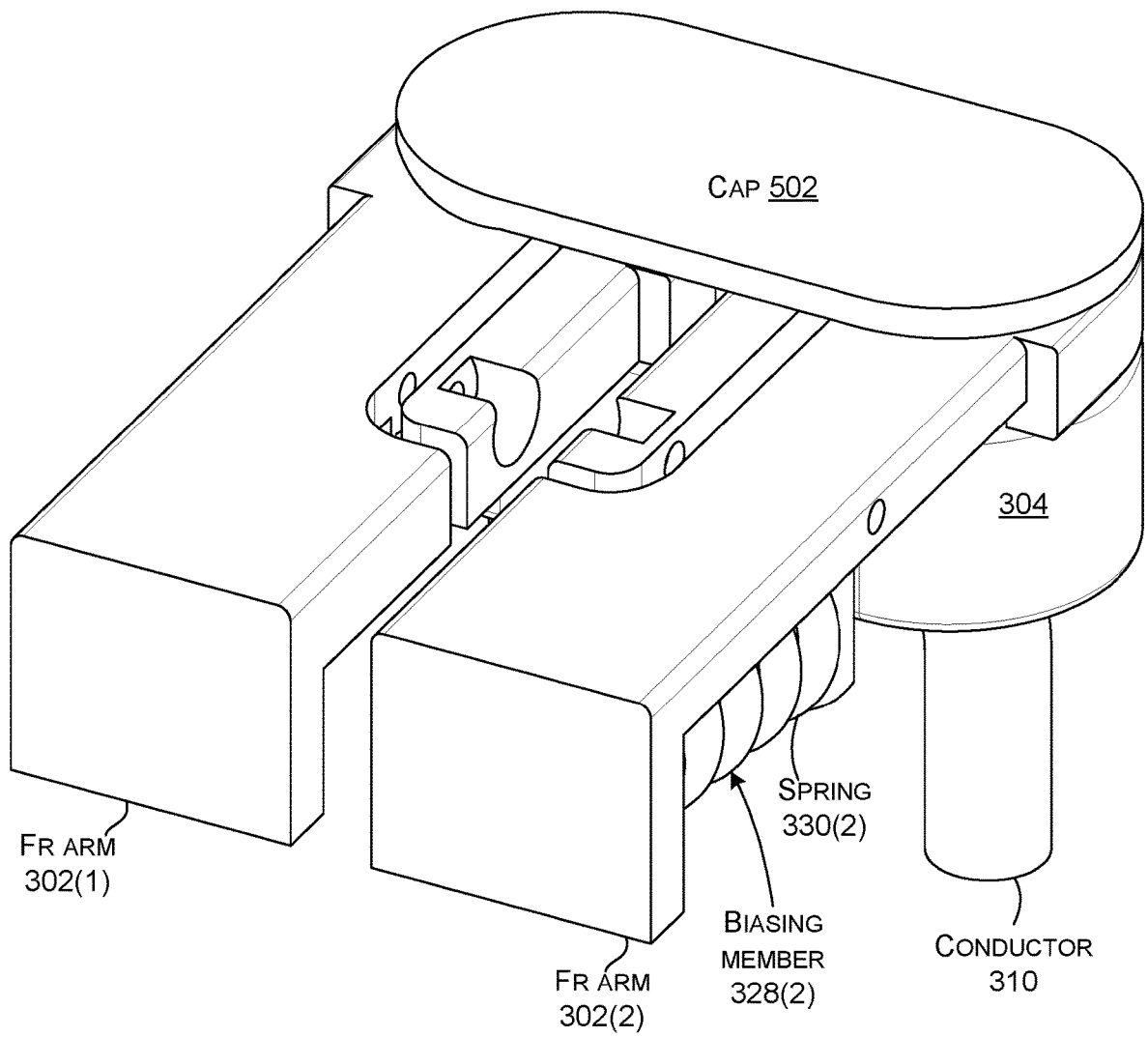
Figure 6D:
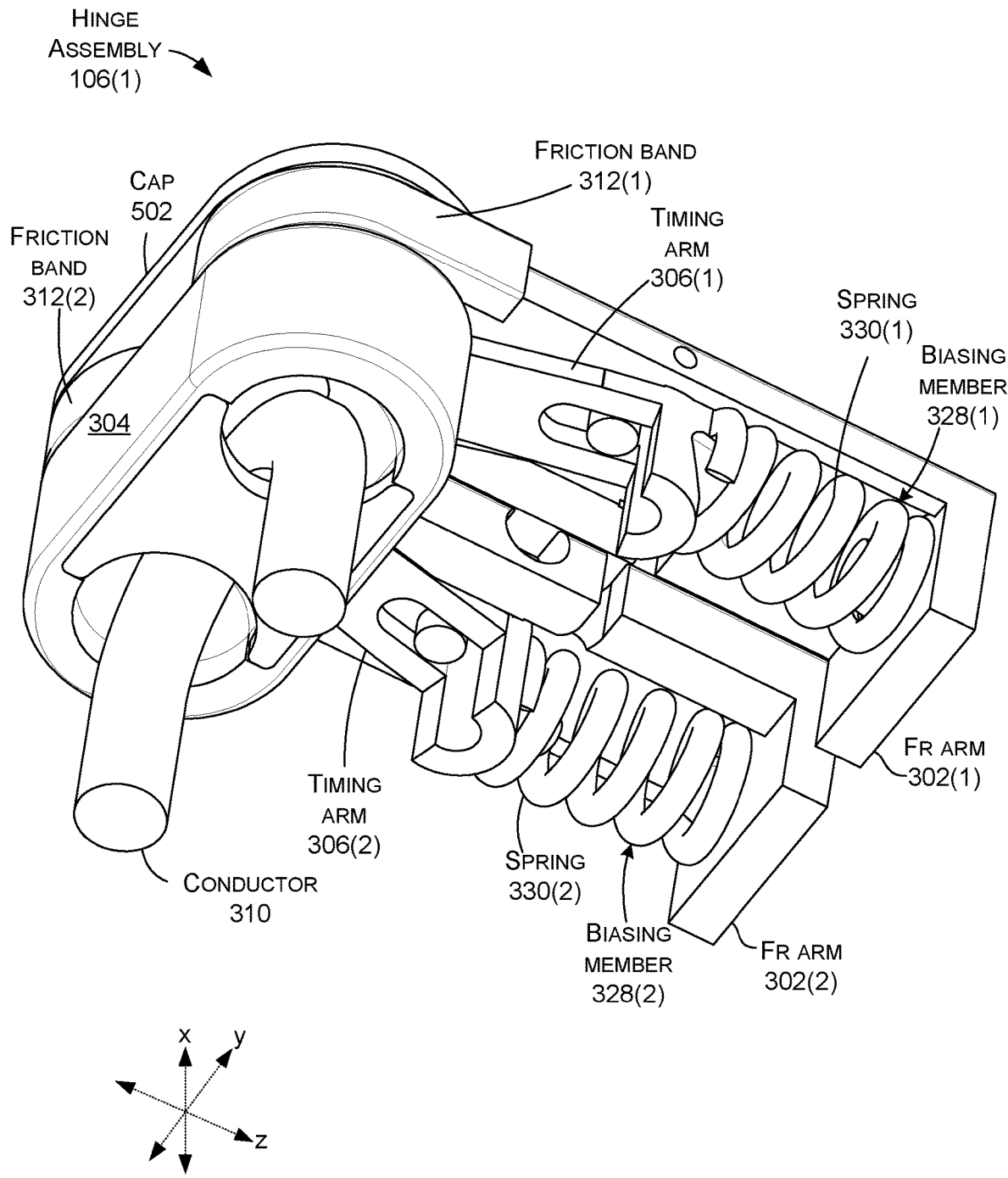
Figure 6E:
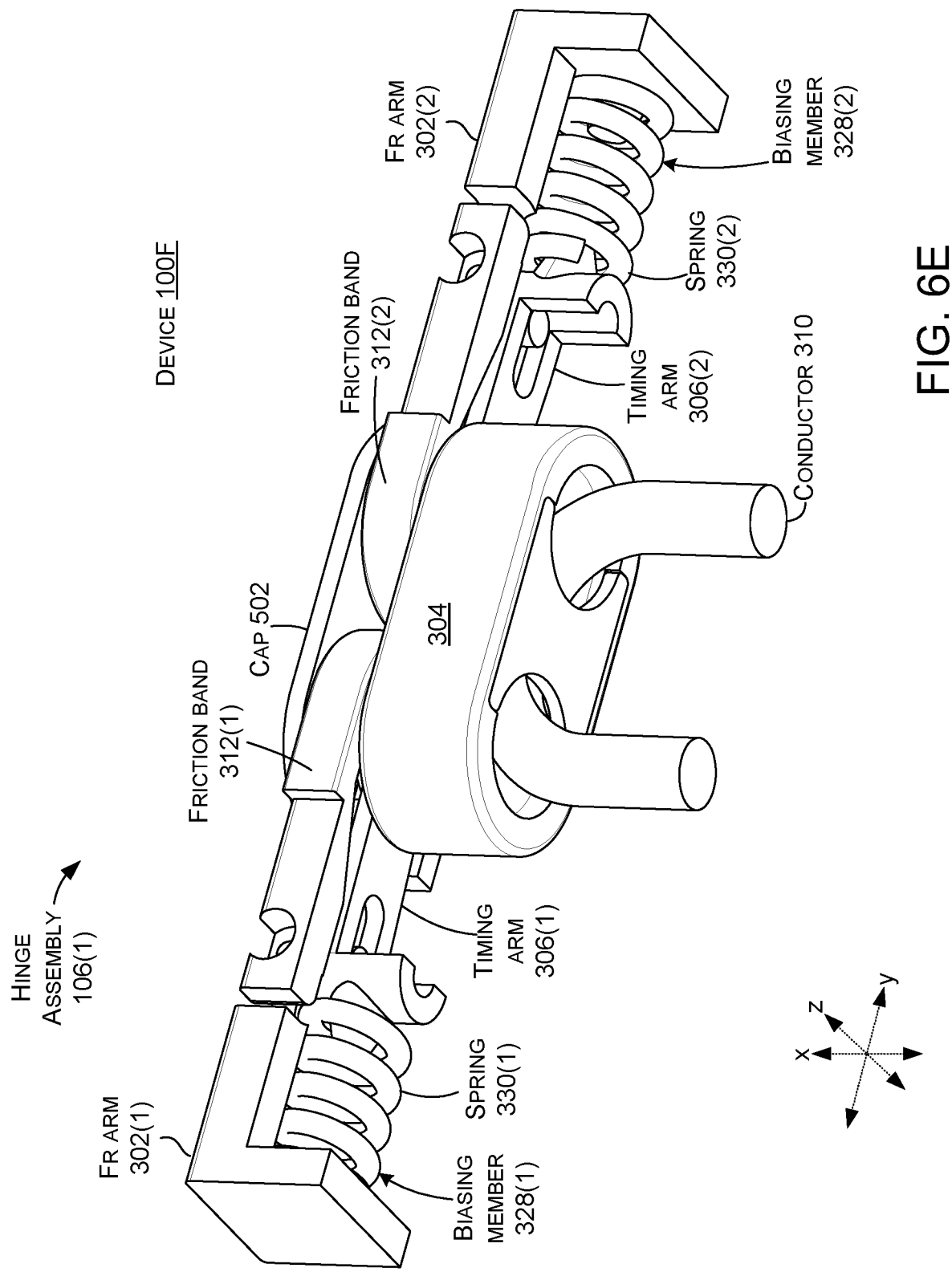
Figure 6F:
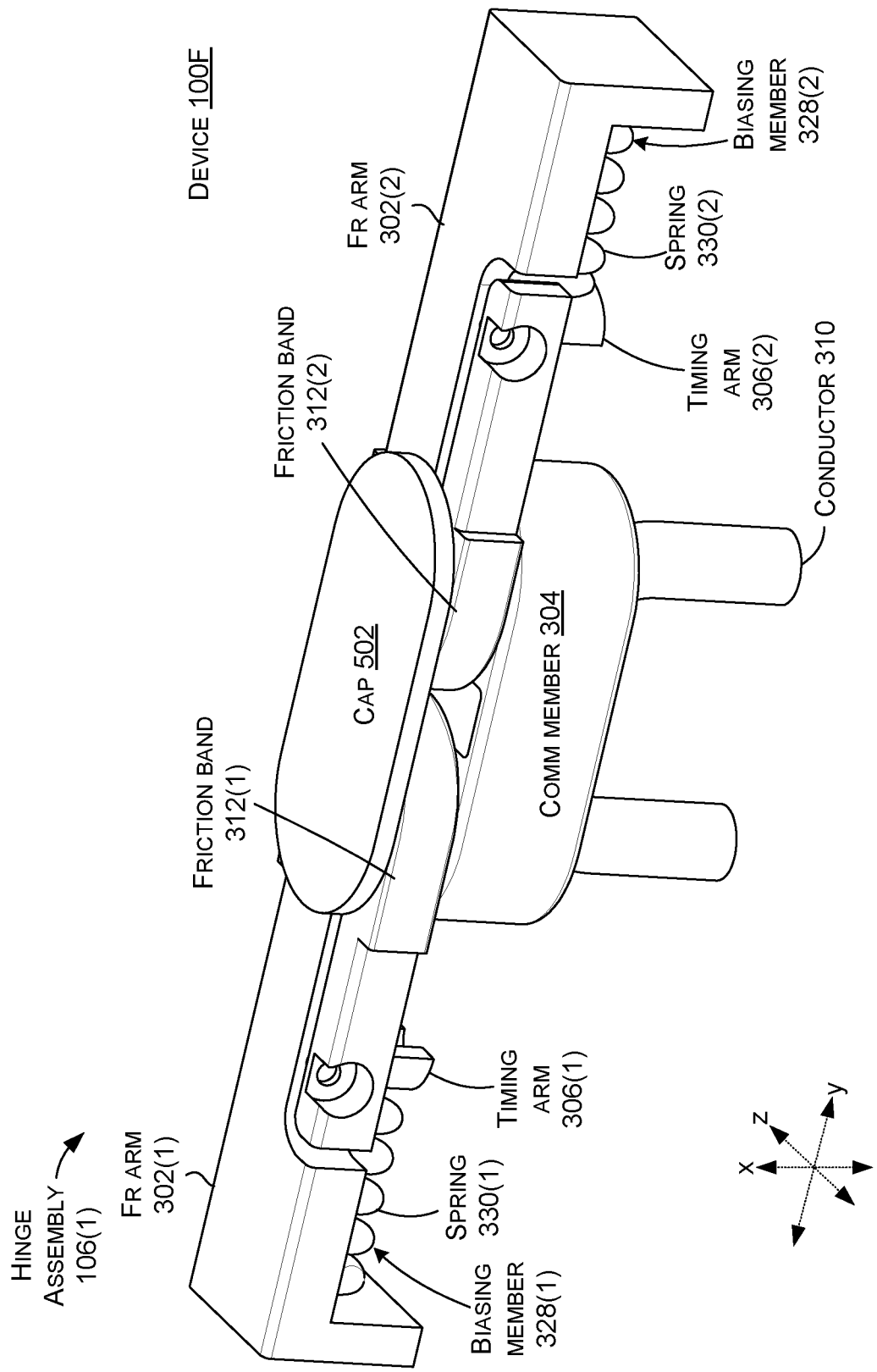
Figure 6G:
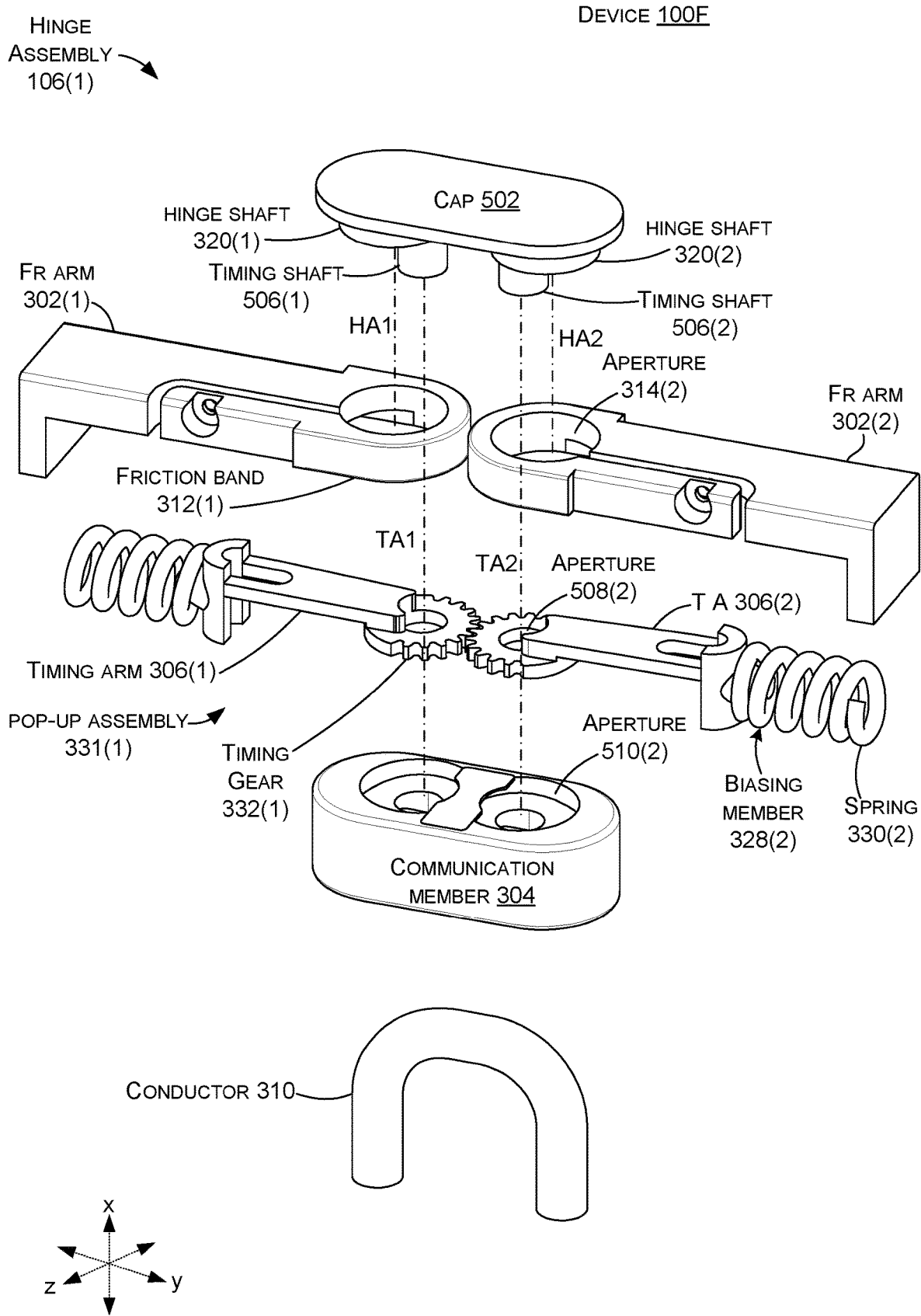
Figure 6H:
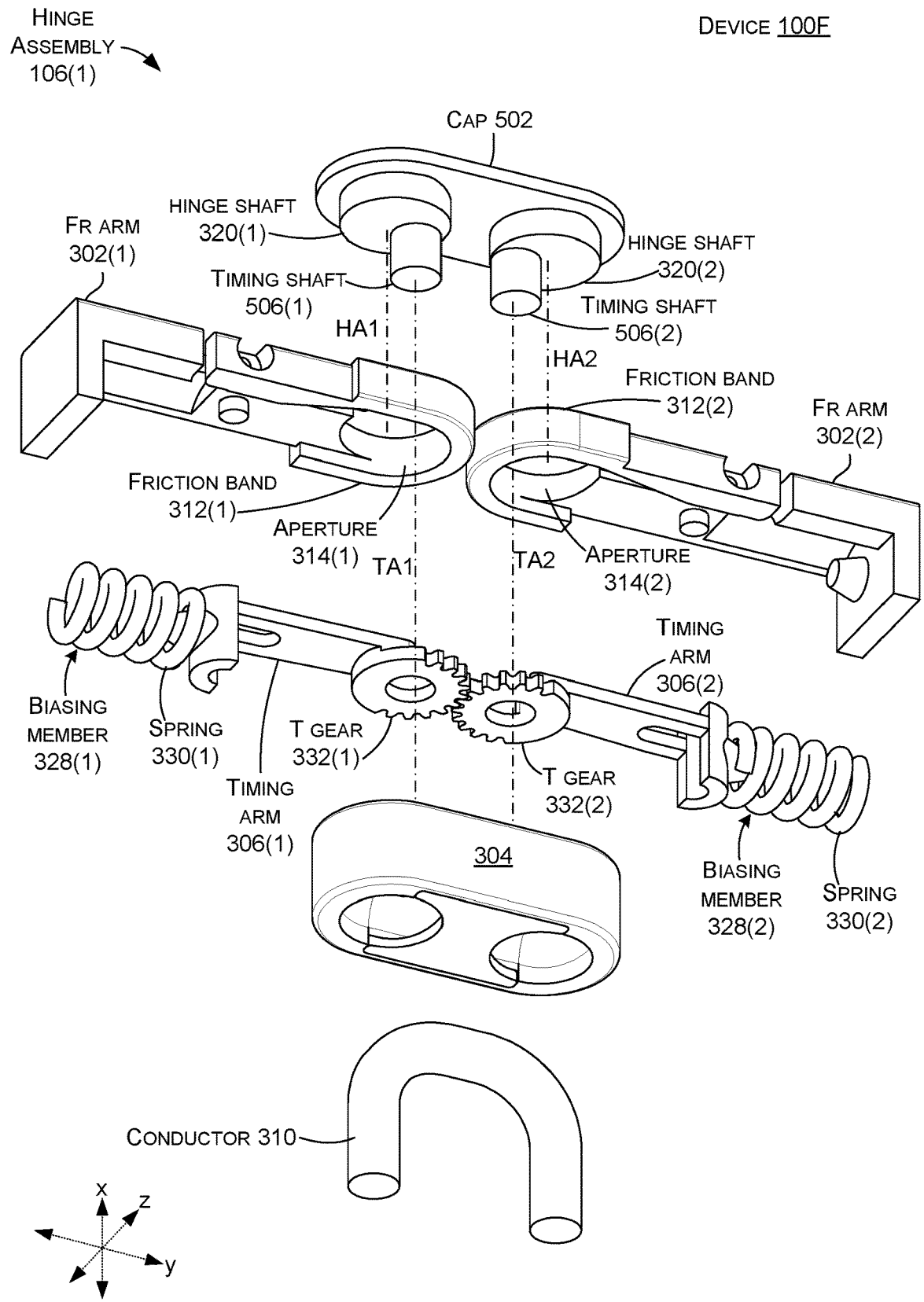
Figure 6I:
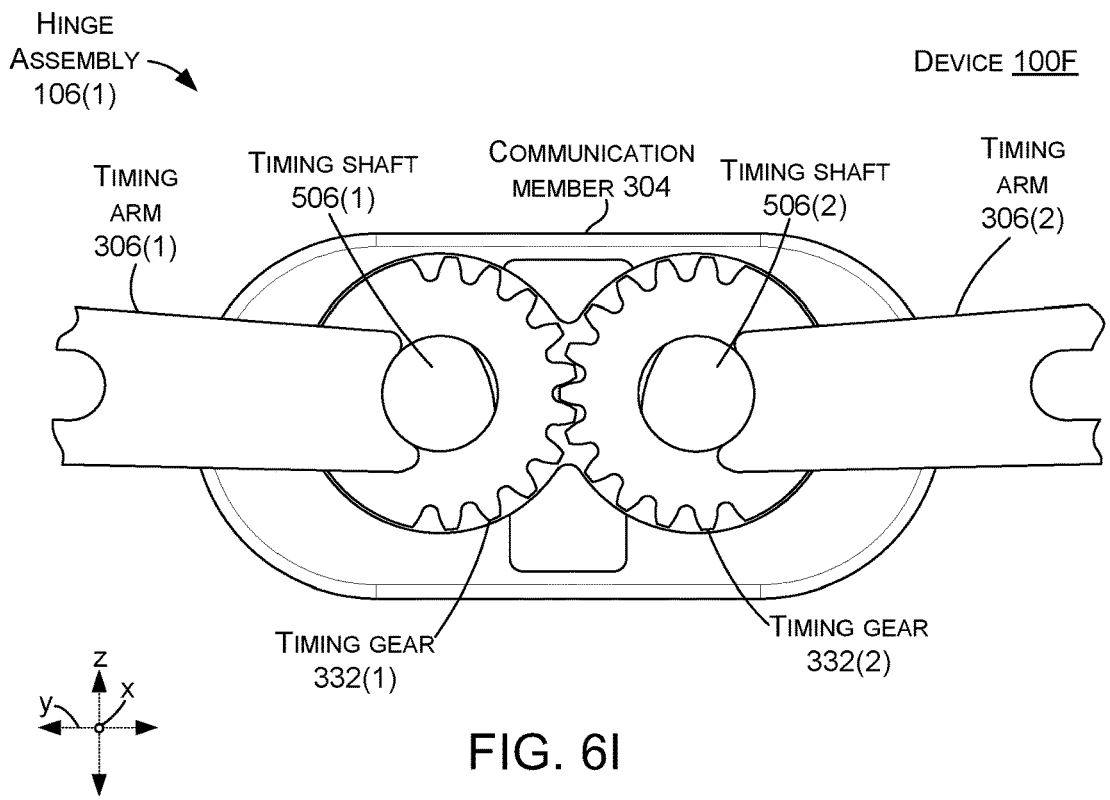
Figure 6J:
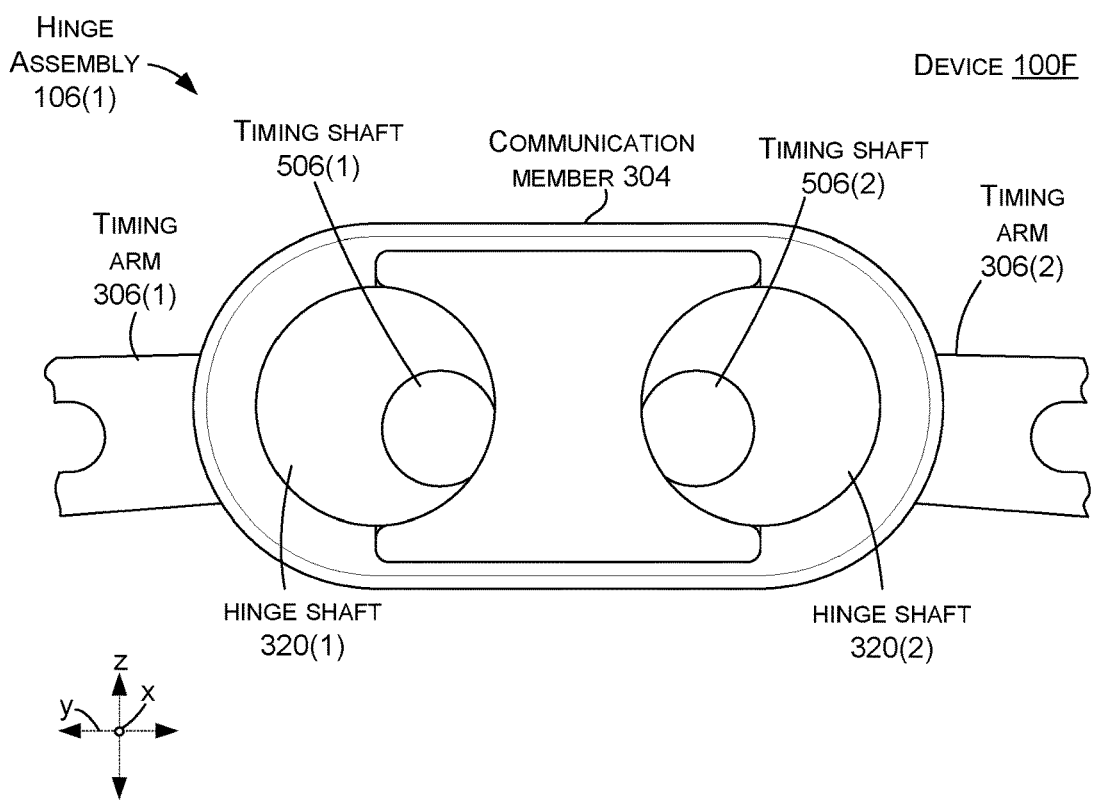

FIGS. 6A-6M collectively show another example device 100F that includes hinge assembly 106(1). FIG. 6A shows a perspective view from 'above' the hinge assembly 106(1) at the zero-degree orientation. FIG. 6B shows a perspective view from 'below' the hinge assembly 106(1) at the zero-degree orientation. FIG. 6C shows another perspective view from 'above' the device in the zero-degree or closed orientation. FIG. 6D shows another perspective view from 'below' the hinge assembly 106(1) at the zero-degree orientation. FIG. 6E shows a perspective view of the hinge assembly 106(1) at the 180-degree orientation. FIG. 6F shows another perspective view of the hinge assembly 106(1) at the 180-degree orientation from the opposite side as FIG. 6E. FIG. 6G shows an exploded perspective view of the hinge assembly 106(1) at the 180-degree orientation that is similar to FIG. 6F. FIG. 6H shows an exploded perspective view of the hinge assembly 106(1) at the 180-degree orientation from 'below' the hinge assembly that is similar to FIG. 6E. FIGS. 6I and 6J are elevational views of the hinge assembly at the 180-degree orientation looking down the x-reference axis (e.g., down the hinge axes).

Figure 6K:
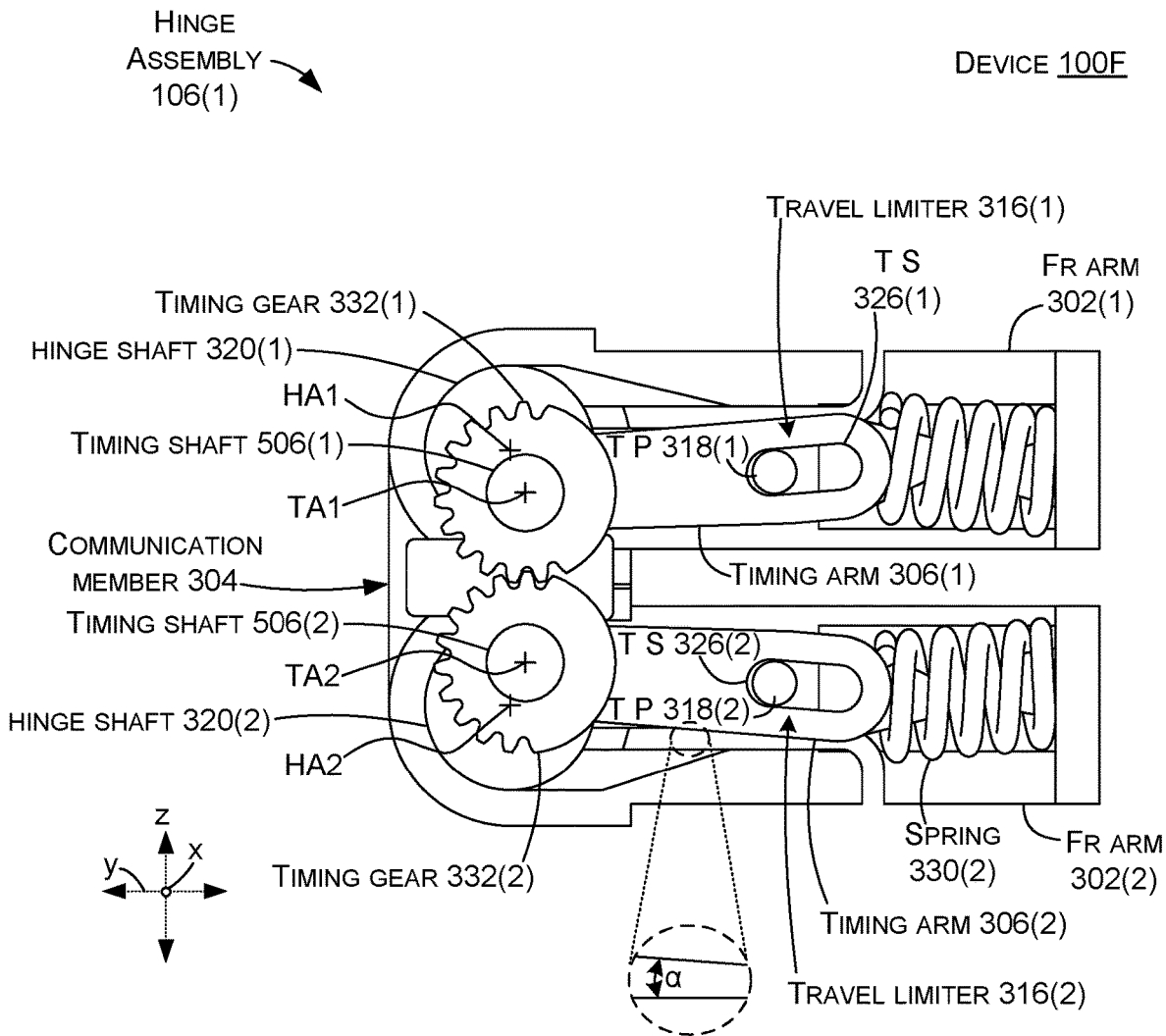
Figure 6L:
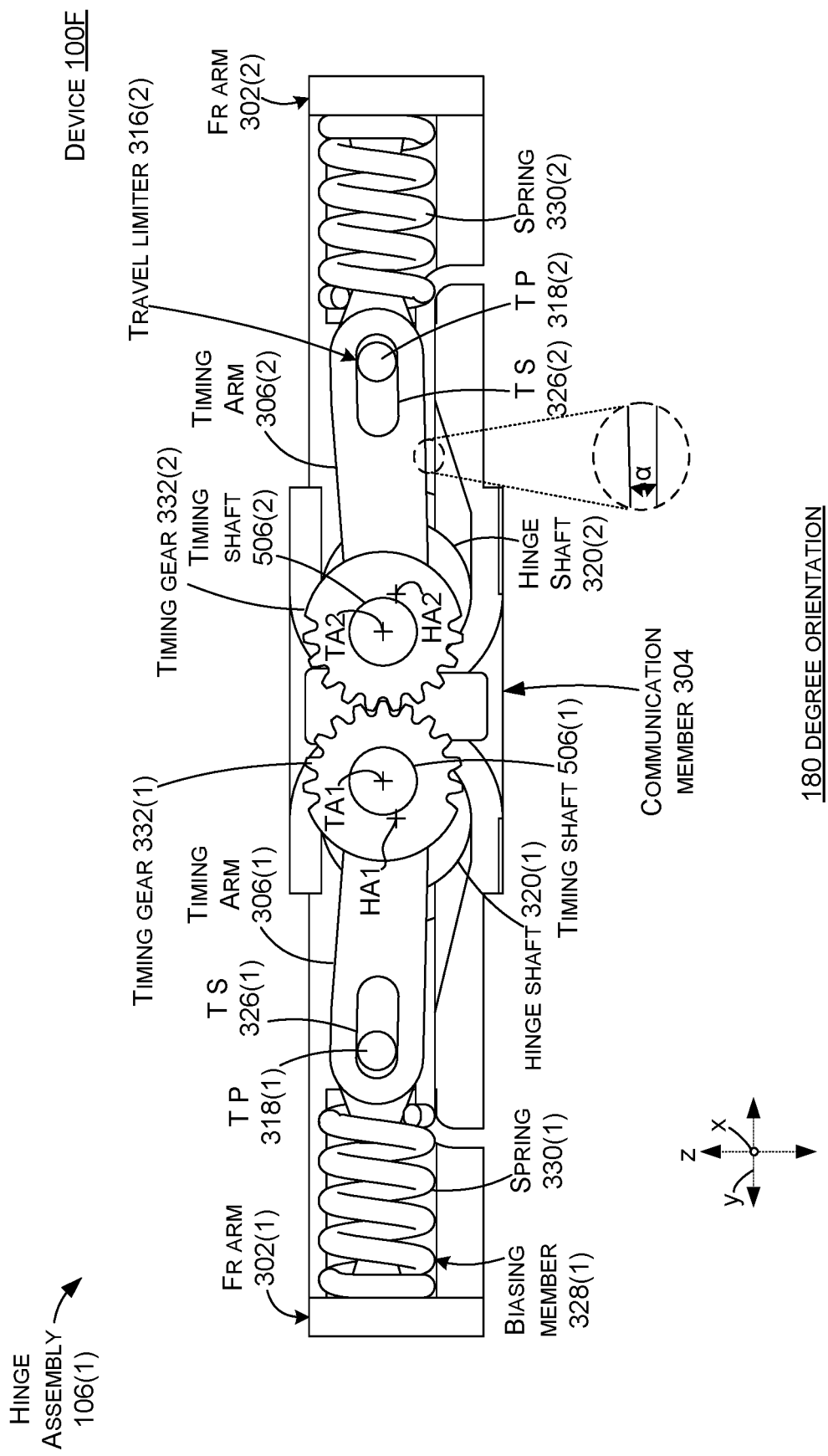
Figure 6M:
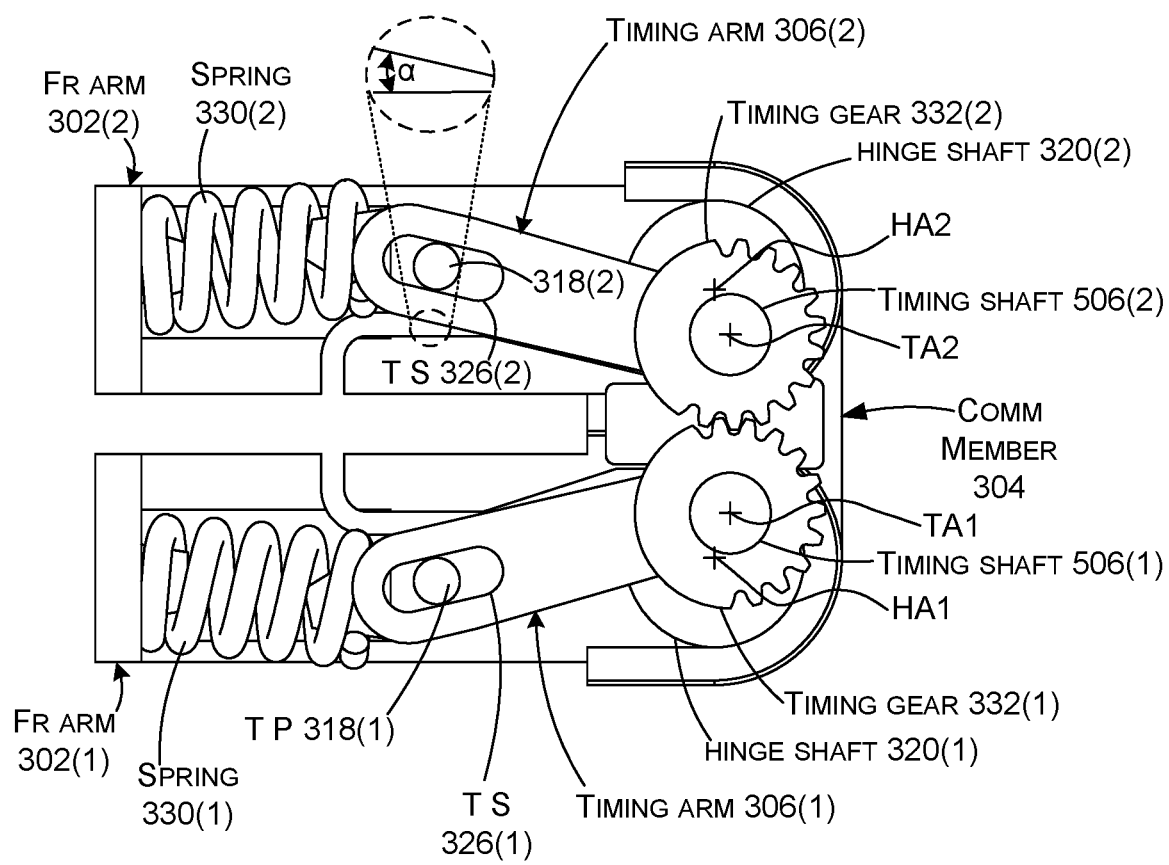
Figure 6M:
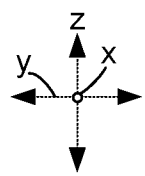

FIGS. 6K-6M show the hinge assembly 106(1) at several orientations in the range of rotation of the device. FIG. 6K shows the closed orientation (zero-degree orientation). FIG. 6L shows the 180-degree orientation and FIG. 6M shows the 360-degree orientation.

This hinge assembly is similar to the hinge assembly described above relative to FIGS. 5A-5D. In this case, the biasing members 328 are manifest as coil springs 330 that can be compressed between the timing arms 306 and the friction arms 302 depending upon the orientation of the first and second portions.

In the zero-degree orientation shown in FIG. 6K, the timing arms 306 have moved as far as possible into the friction arms 302 and the springs 330 are fully compressed. Note that the travel pins 318 are at the left (e.g., proximal) extreme of the travel slots 326 and thus further movement of the timing arms 306 to the right is blocked.

Viewed from one perspective, the offset of the timing axes TA from the hinge axes HA can cause the timing arms 306 to be forced against the springs 330 as the first and second portions approach the zero-degree orientation. The timing arms 306 compress the springs 330 and store potential energy in the springs. The potential energy is exerted on the timing arms. Due to the offset between the timing axes TA and the hinge axes HA, the timing arms 306 create a torque on the first and second portions that can be viewed as a pop-up force. Thus, the device may be held in this zero-degree orientation, such as with a lock. When the lock is removed, the pop-up force created by the compressed springs 330 can force the first and second portions to rotate to an open orientation, such as 20-30 degrees, for example. At this point in the rotation, the springs 330 are uncompressed and thus do not create any more pop-up force.

In the 180-degree orientation of FIG. 6L, the springs 330 have biased the timing arms 306 most of the way back toward the center of the drawing page. Note that the travel pins 318 are near the opposite ends (e.g., distal ends) of the travel slots 326. This movement of the travel pins 318 in the travel slots 326 can reflect the linear movement between the timing arms 306 and the friction arms 302. At this point the timing arms 306 are not compressing the springs 330 and as such the springs are not storing or imparting energy that creates a pop-up force on the first and second portions.

In the 360-degree orientation of FIG. 6M, the timing arms 306 have partially overcome the spring bias and slightly compressed the springs 330 to allow the timing arms 306 to move part way back into the friction arms 302. The slightly compressed springs 330 can create a small pop-up force. The geometry of the hinge assembly can be adjusted as desired to create more, less, or no spring compression at the 360-degree orientation depending upon whether pop-up is desired from the 360-degree orientation.

Note also, that this implementation can define a range of axial rotation between the friction arms 302 and the timing arms 306. The relative axial rotation can result from the timing arms rotating around the timing axes TA, while the friction arms rotate around the hinge axes HA. In this case, the range of axial relative rotation can be defined by the timing slots 326 and the timing pins 318. The range of axial relative rotation can be represented by a change to an angle "α" defined between the timing arms 306 and the friction arms 302. Angle α can change as the orientation of the device changes from the zero-degree orientation of FIG. 6K to the 180-degree orientation of FIG. 6L to the 360-degree orientation of FIG. 6M, for example.

This configuration can define and limit relative rotation between the timing arms 306 and the friction arms 302 via the timing pins 318 and the timing slots 326 in combination with the timing arms rotating around the timing axes and the friction arms rotating around the hinge axes. This configuration can allow the location of the timing axes TA to be selected to keep the timing gears 332 intermeshing during the entire range of rotation without the timing arms 306 binding with other components, such as the friction arms 302, which would occur if the timing arms rotated around the hinge axes. Thus, employing timing axes that are independent of the hinge axes, as well as travel limiters 316 can provide the technical benefit of allowing the timing gears to be larger and more robust while eliminating intervening gears. Intervening timing gears can have high failure rates and/or introduce unwanted backlash in the hinge system.

Figure 7A:
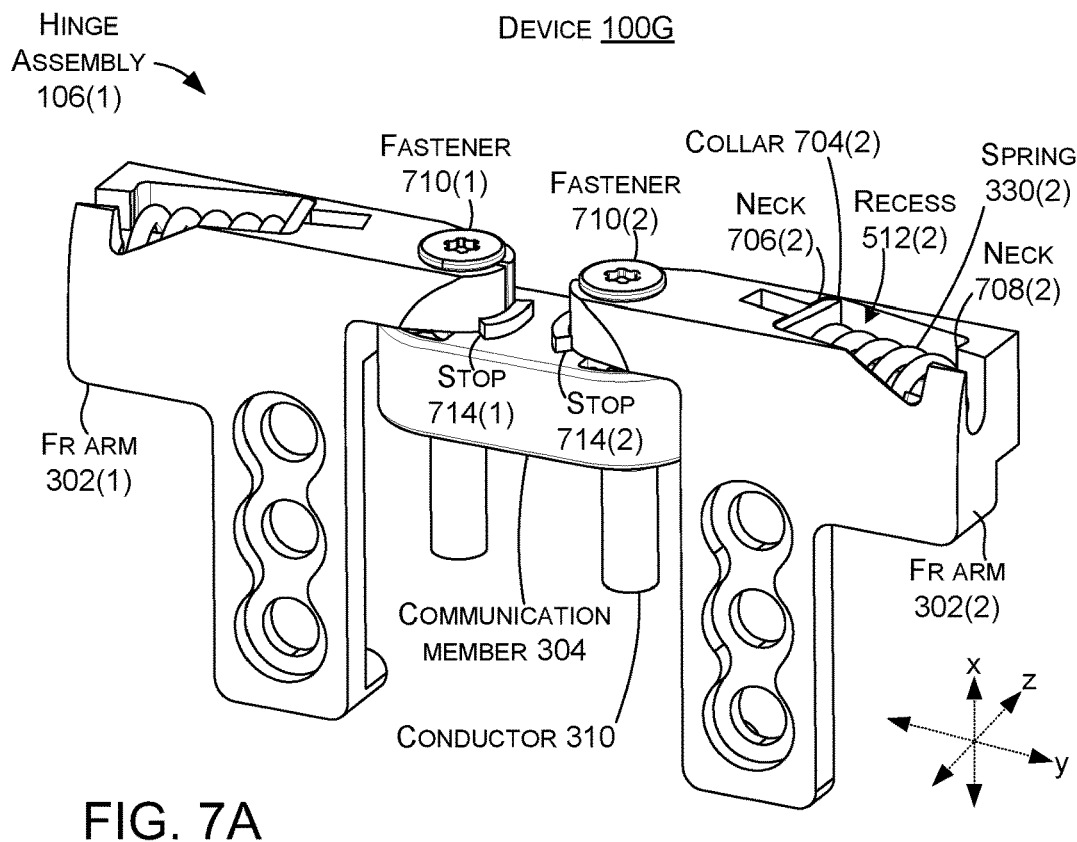
Figure 7B:
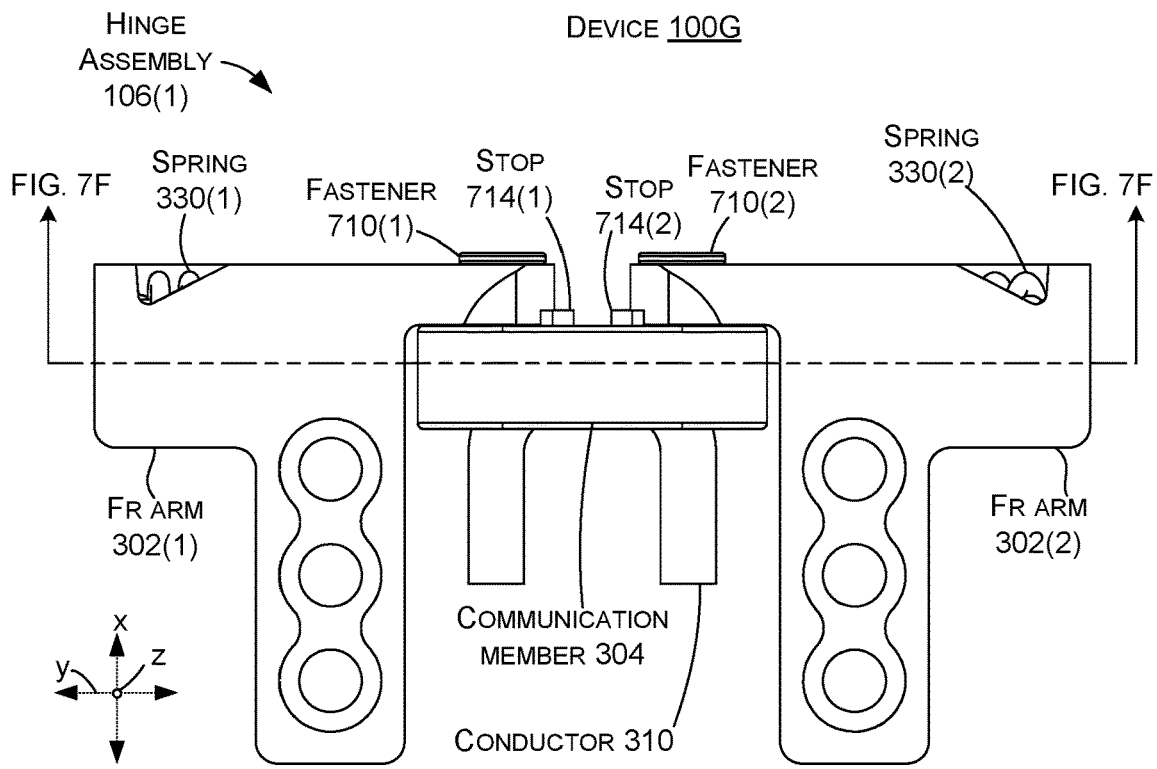
Figure 7C:
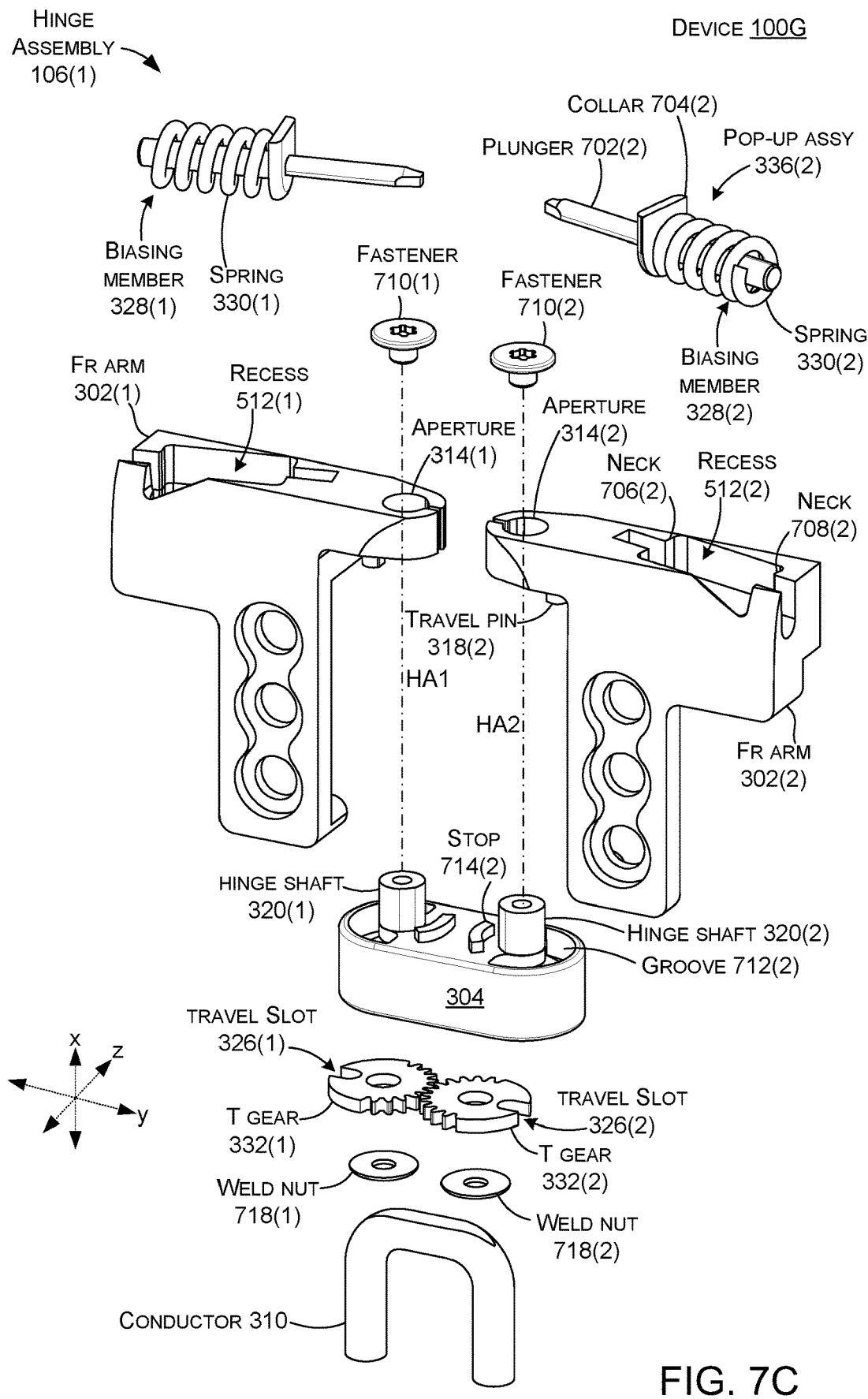
Figure 7D:
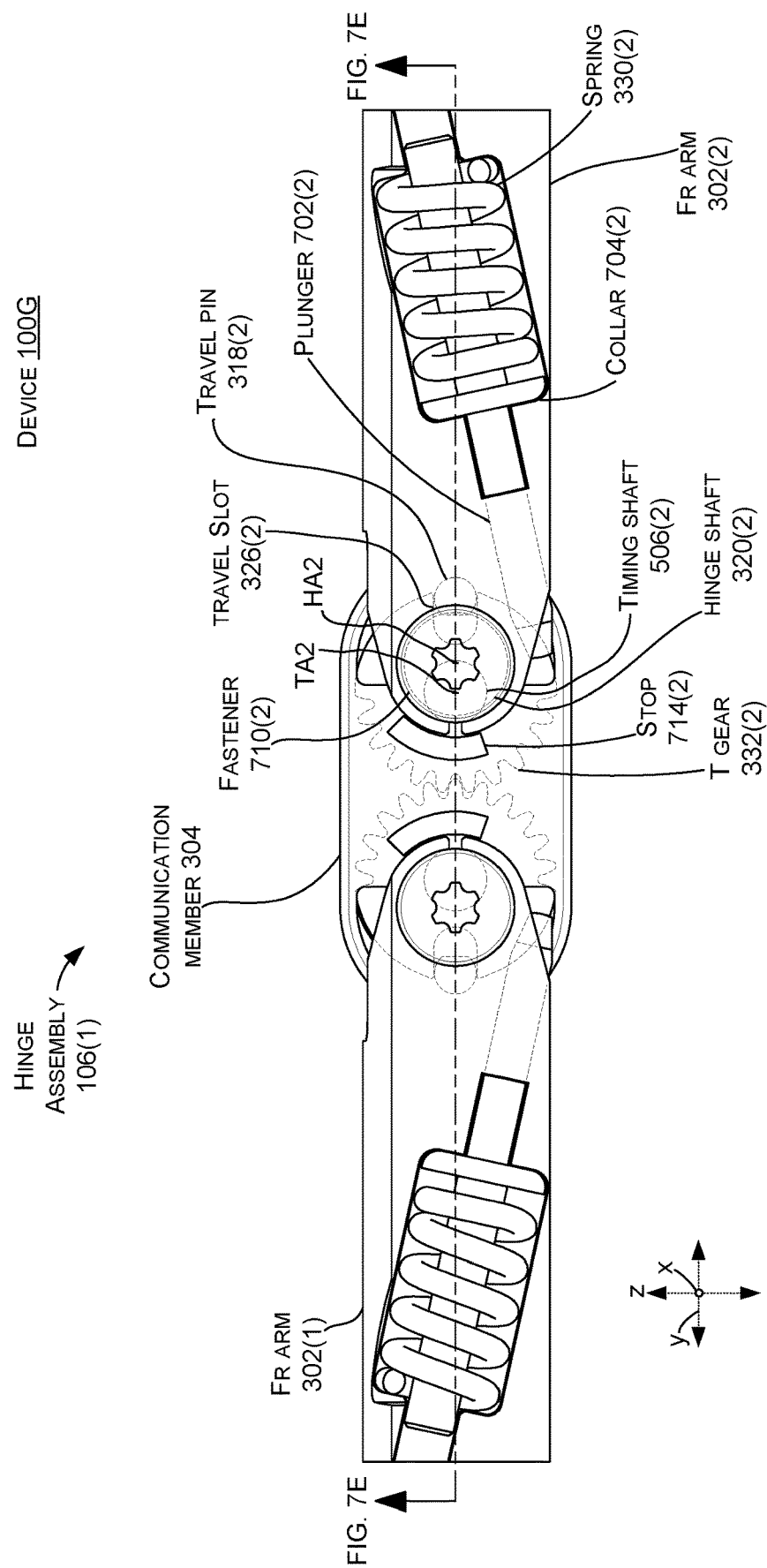
Figure 7E:
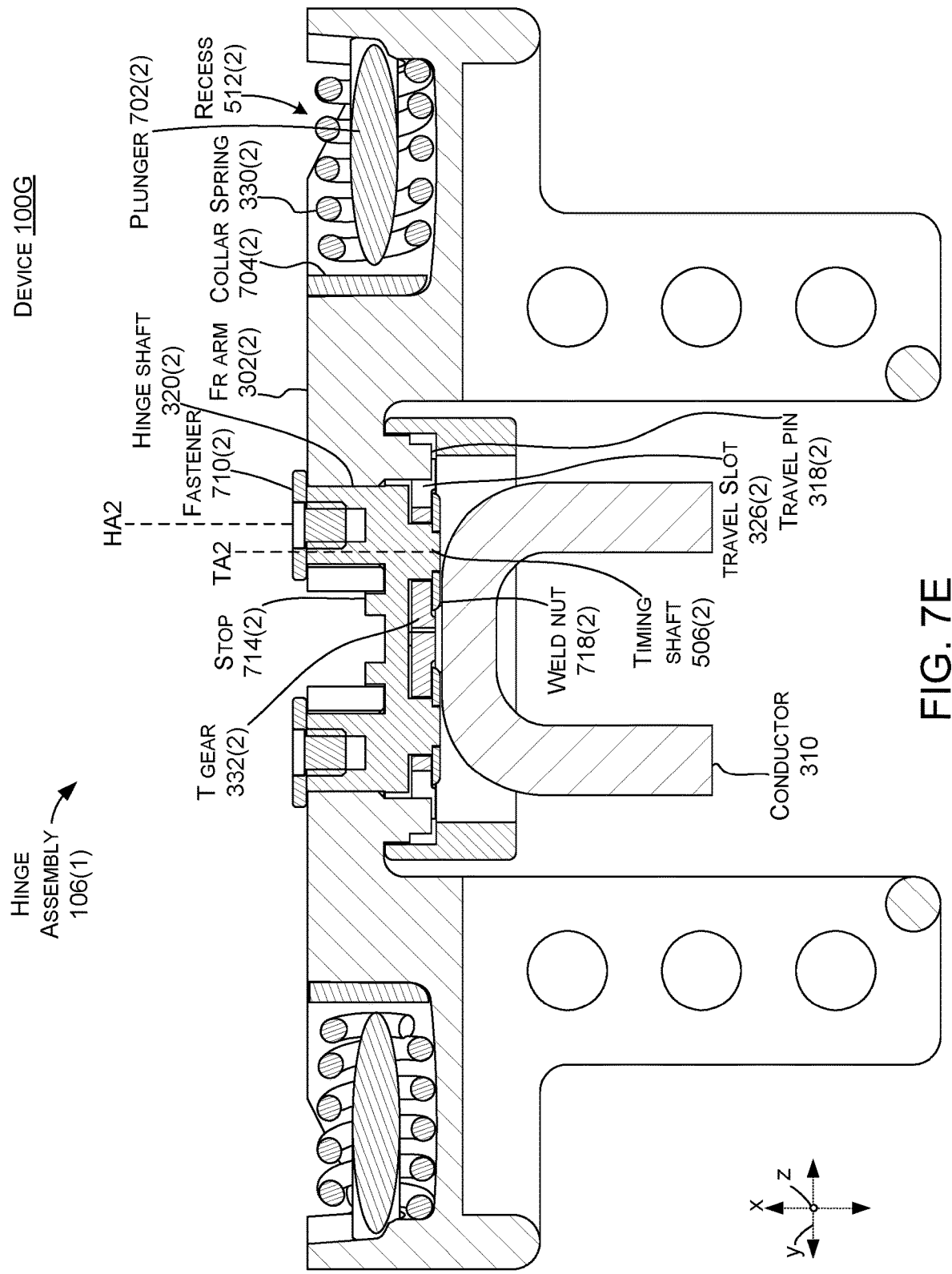
FIGS. 7E, 7G, and 8H show sectional views of example devices in accordance with some implementations of the present concepts.
Figure 7F:
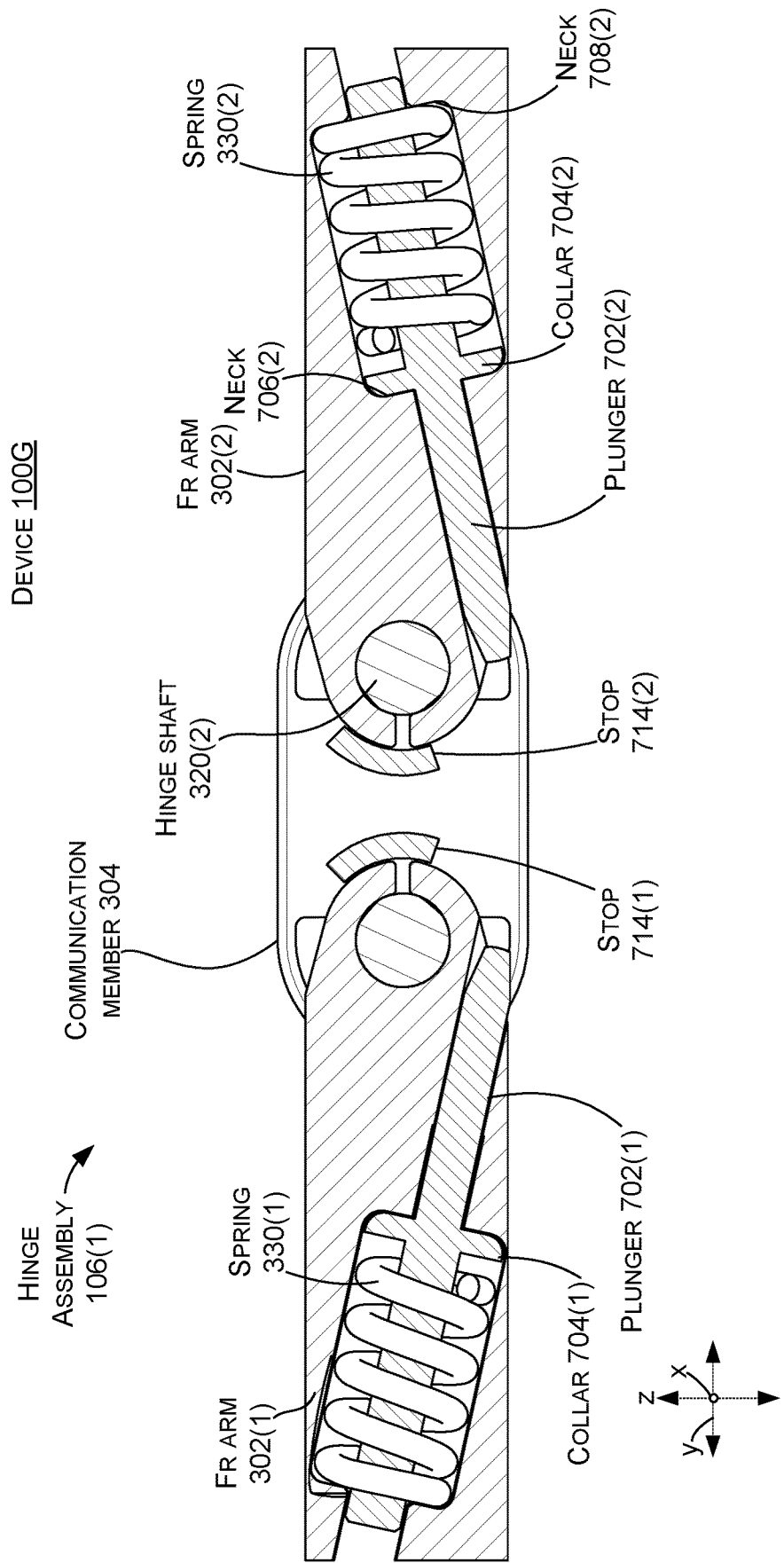
Figure 7G:
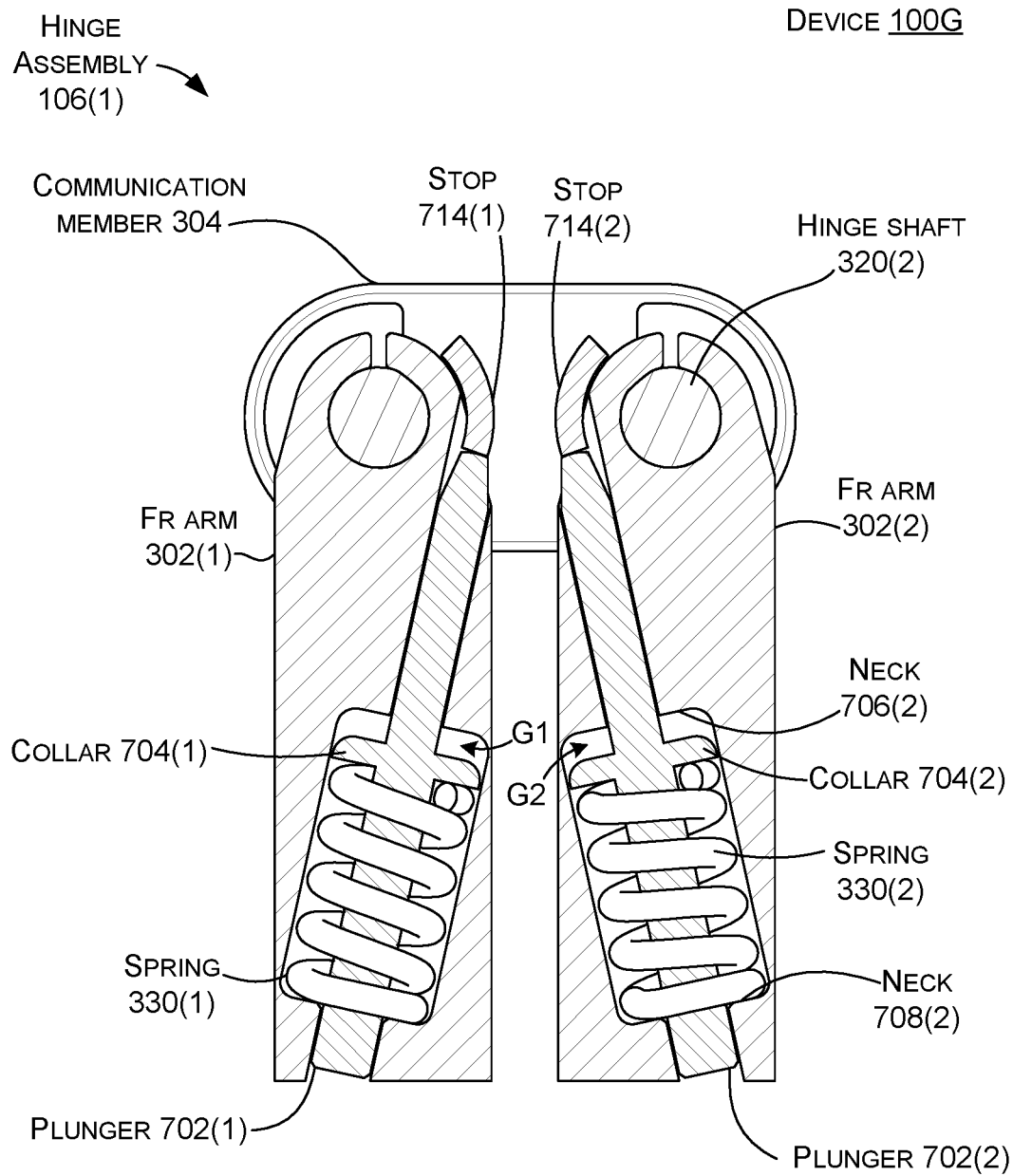

FIGS. 7A-7G collectively show another example device 100G that includes hinge assembly 106(1). FIG. 7A shows a perspective view of the hinge assembly 106(1) in the 180-degree orientation. FIG. 7B shows an elevational view of the of the hinge assembly 106(1) in the 180-degree orientation. FIG. 7C shows an exploded perspective view of the hinge assembly 106(1) in the 180-degree orientation that is similar to FIG. 7A. FIG. 7D is an elevational view of the hinge assembly 106(1) at the 180-degree orientation looking down the x-reference axis (e.g., down the hinge axes) with some obstructed elements shown in ghost. FIG. 7E is a sectional view of the hinge assembly 106(1) in the 180-degree orientation as indicated in FIG. 7D. FIG. 7F is a sectional view of the hinge assembly 106(1) in the 180-degree orientation as indicated in FIG. 7B. FIG. 7G is a sectional view of the hinge assembly 106(1) in the zero-degree orientation.

In this case, the hinge assembly 106(1) includes plungers 702, collars 704 secured to the plungers, and springs 330 (or other biasing members 328). In this example, the springs 330 are positioned on the plungers 702 against the collars 704. The plungers 702, collars 704, and springs 330 can be positioned in recesses 512. The recesses 512 can include necks 706 and 708 to retain the springs 330 and the collars 704. The plungers 702 can extend out of both ends of the recesses 512.

The hinge assembly 106(1) also includes fasteners 710 that secure the hinge shafts 320 in the apertures 314 defined by the friction arms 302. The communication member 304 defines grooves 712 and stops 714. Travel pins 318 of the friction arms extend through the grooves 712 and engage travel slots 326 in the timing gears 332. The timing gears 332 can be positioned on timing shafts 506 defined by the communication member 304. Weld nuts 718 or other mechanisms can retain the timing gears 332 on the timing shafts 506. In this case, from one perspective, the travel pins 318 and the travel slots 326 can function as timing arms 306 with the travel slots 326 being formed in the timing gears 332 themselves.

As can be seen in FIG. 7D, the friction arms 302 can rotate around the hinge axes (HA), while the timing gears 332 can rotate around the timing axes (TA). The combination of the travel pins 318 and travel slots 326 can allow relative linear movement between the friction arms 302 and the timing gears 332 toward and away from the hinge assembly 106(1) and can define relative axial movement around the hinge assembly.

As the rotation approaches the closed orientation, such as at 30 degrees (e.g., fifteen degrees on each hinge axis), the plungers 702 can engage the stops 714. Further closing rotation (toward zero degrees) can cause the stops 714 to exert forces on the plungers 702 which causes the plungers to move away from the hinge assembly (e.g., away from the hinge axes). The movement of the plungers 702 causes the collars 704 to compress the springs 330. This aspect is evident in the zero-degree orientation of FIG. 7G where the stops 714 are pushing on plungers 702 to compress springs 330. Specifically, the collars 704 compress the springs 330 as evidenced by gaps G between necks 706 and collars 704. This can be compared to the 180-degree orientation of FIG. 7F where the stops 714 are not engaging the plungers 702 and the collars 704 are proximate to the necks 706 (e.g., no gaps G). The compressed springs 330 shown in the zero-degree orientation of FIG. 7G can store energy (e.g., pop-up energy).

In this case, the pop-up force can be generated by plungers 702, collars 704 secured to the plungers, and springs 330. Stated another way, as the first and second portions are rotated to the closed orientation, the stops 714 force the plungers 702 away from the hinge axes. The plungers 702 (with the aid of the collars 704) capture and compress the springs 330, which store this energy which is returned to the hinge assembly as the pop-up force.

The stored pop-up energy can create a more effective pop-up force if it is not countered by rotational friction forces. Toward this end, in this case hinge shafts 320 and apertures 314 in the friction arms 302 can have flattened areas that decrease rotational friction for these orientations (e.g., from 0 to 20 degrees). Stated another way, in this example rotational friction can be decreased with a flattened zone (shown but not designated in FIG. 7C) on the hinge shafts 320 aligning with a flattened zone (shown but not designated in FIG. 7C) on the apertures 314 at this orientation (e.g., about zero degrees to about 15 degrees, for example, on each hinge axis).

Figure 8A:
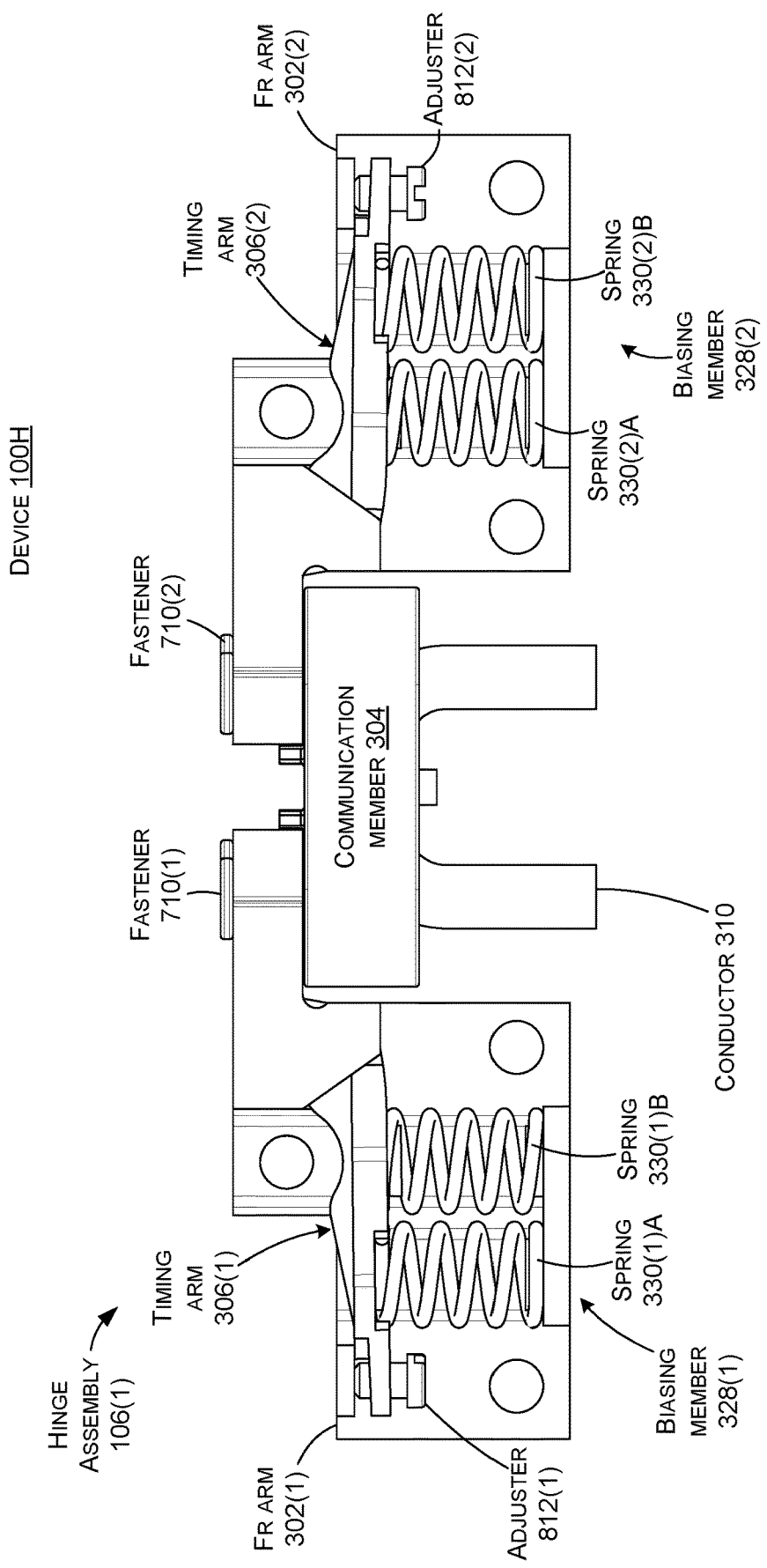
Figure 8B:
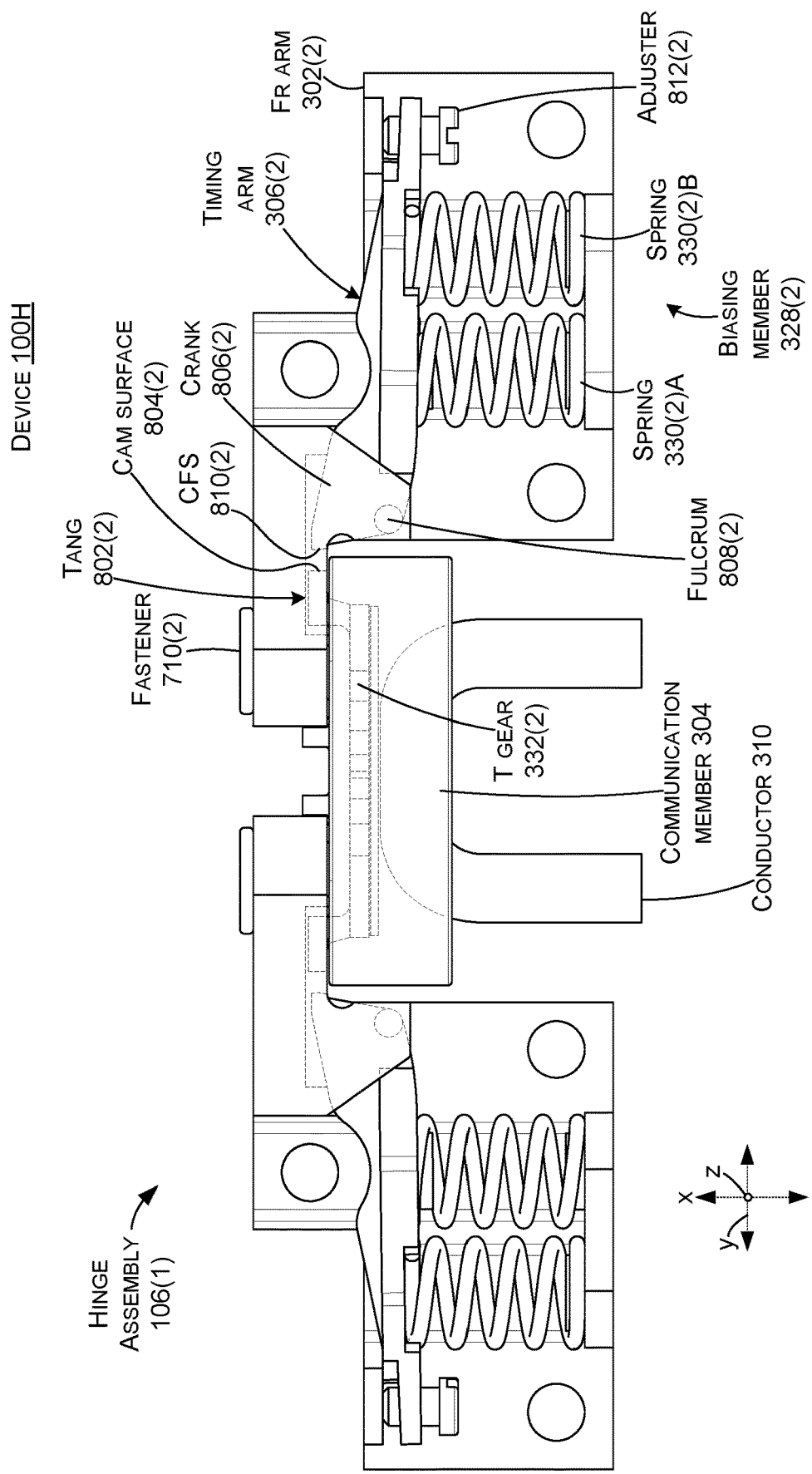
Figure 8C:
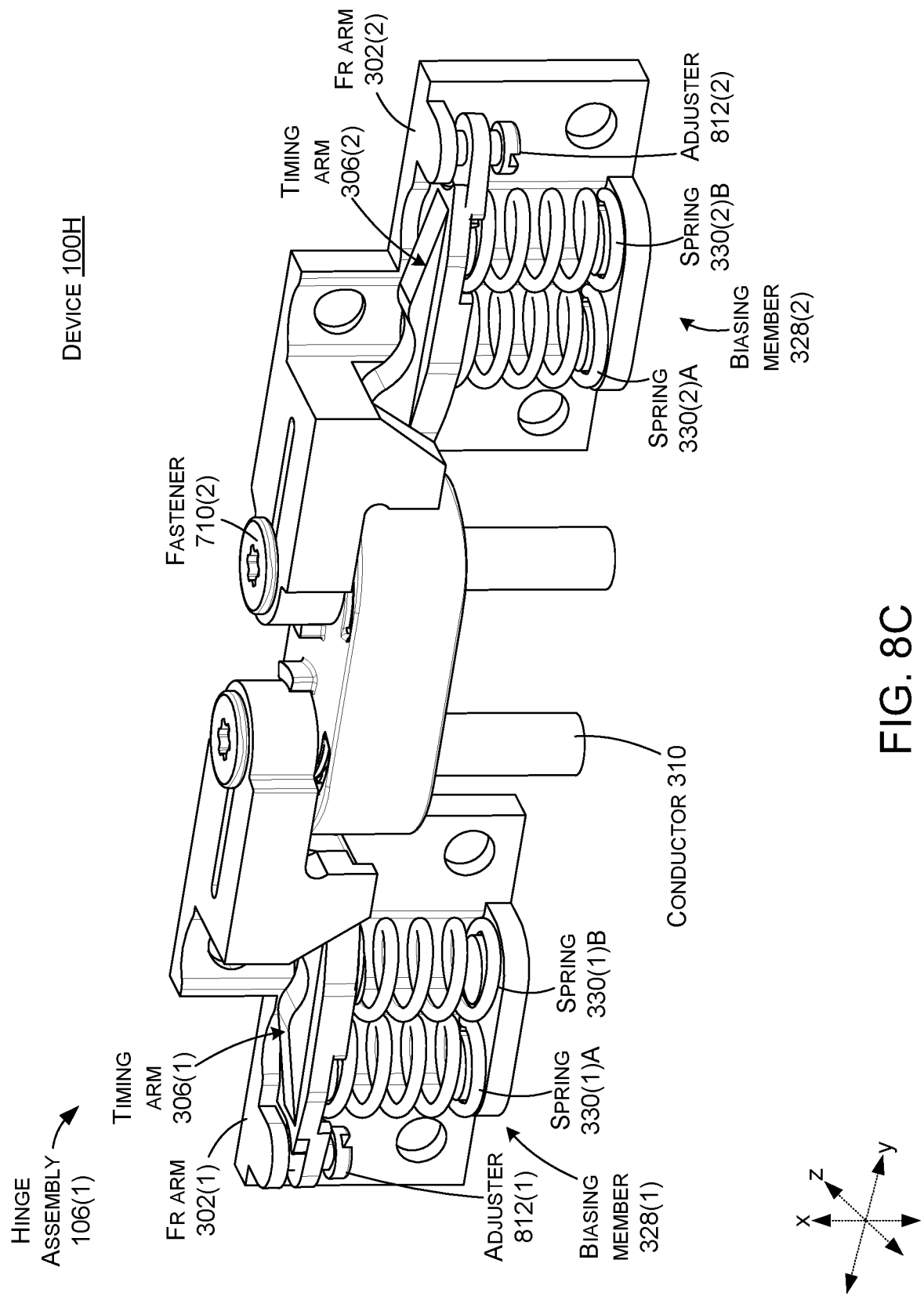
Figure 8D:
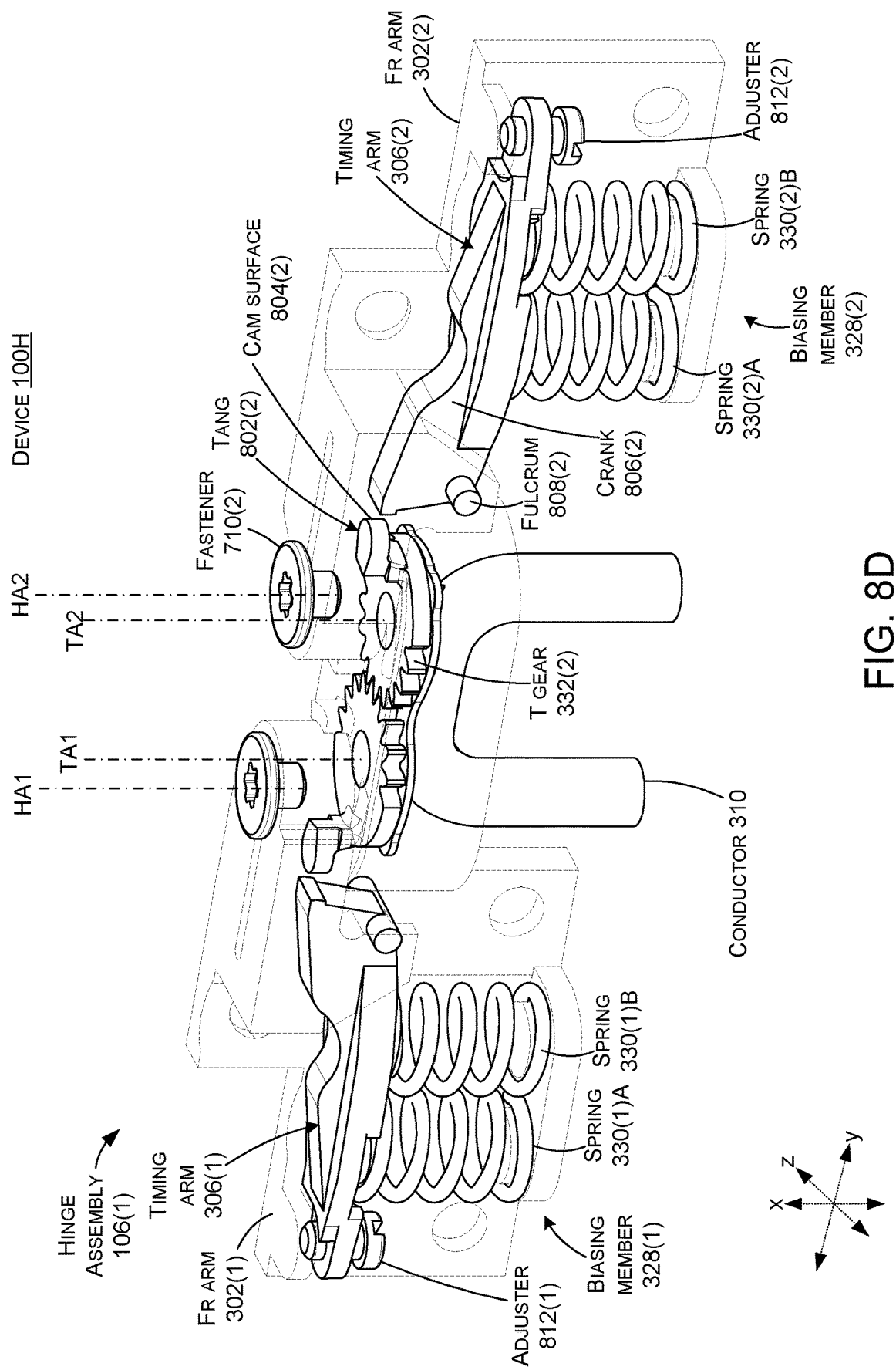
Figure 8E:
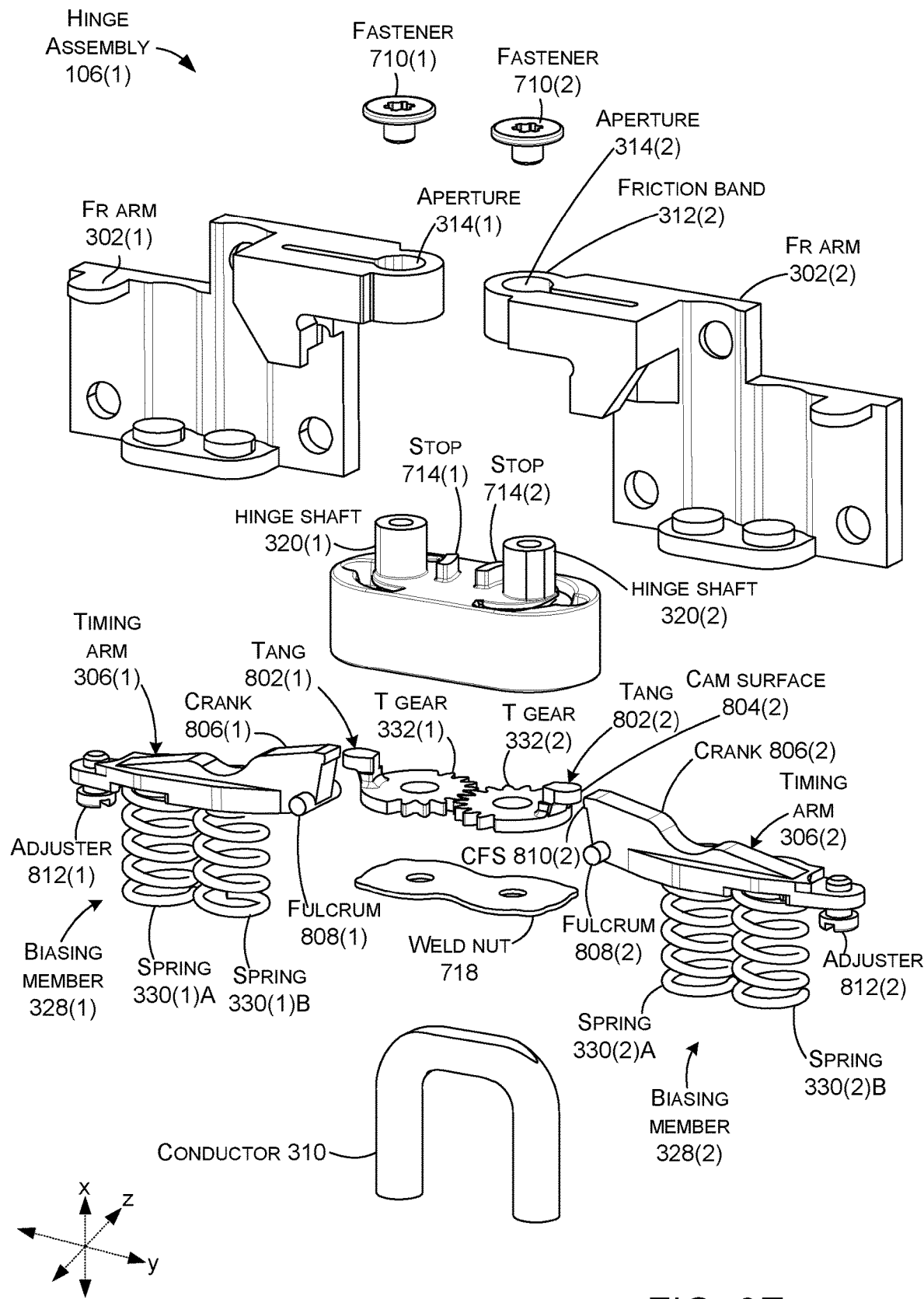
Figure 8F:
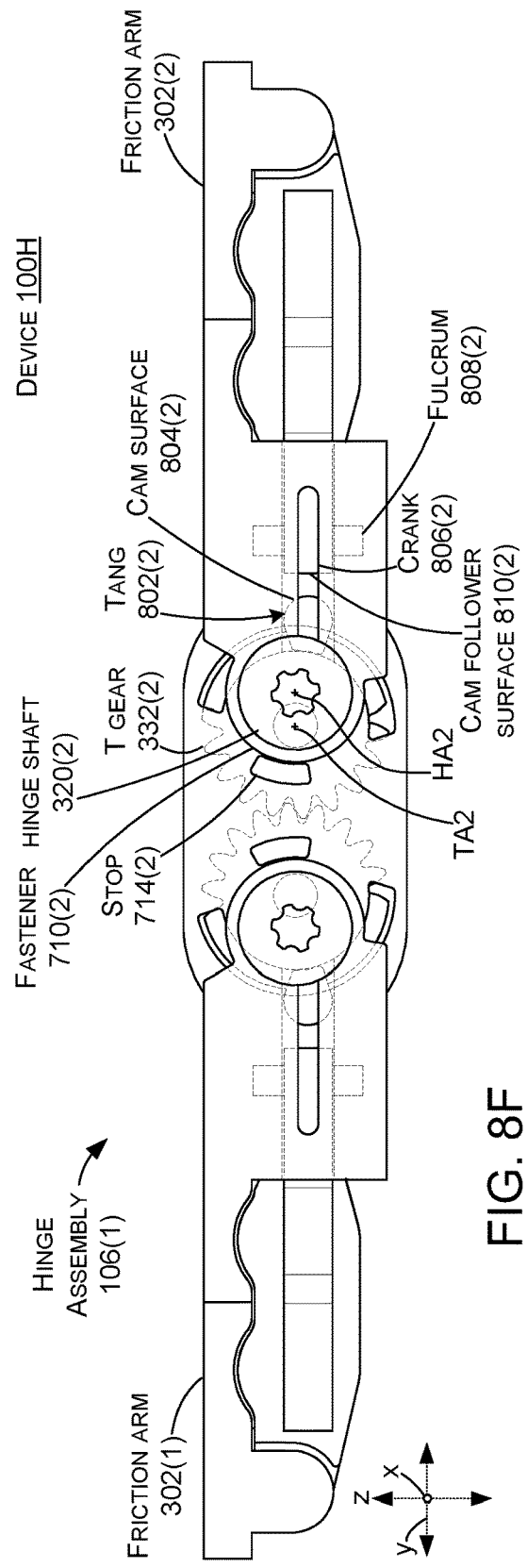

FIGS. 8A-8E collectively show another example device 100H that includes hinge assembly 106(1). FIG. 8A is an elevational view of the hinge assembly in the 180-degree orientation. FIG. 8B is a similar view of the hinge assembly as FIG. 8A with some of the obstructed elements shown in ghost. FIG. 8C is a perspective view of the hinge assembly in the 180-degree orientation. FIG. 8D is another perspective view of the hinge assembly that is similar to FIG. 8C with some of the obstructed elements shown in ghost. FIG. 8E is an exploded perspective view of the hinge assembly in the 180-degree orientation that is similar to FIG. 8C. FIG. 8F is an elevational view of the hinge assembly in the 180-degree orientation with some of the obstructed elements shown in ghost.

As can be seen in FIG. 8E, in this implementation the timing gears 332 include tangs 802. The tangs 802 can slide in travel slots 326 defined by the friction arms 302. In this example, the tangs 802 can be analogous to travel pins 318 (discussed relative to various FIGS. above) that have cam surfaces 804. At certain orientations (e.g., in a range approaching zero degrees) the tangs 802 can engage the timing arms 306. In this case, the timing arms 306 can be viewed as cranks 806 that have fulcrums 808 that are perpendicular to and do not intersect with the hinge axes. In the majority of orientations, the tangs' cam surfaces 804 do not engage the cranks 806. However, as the device rotates toward the closed orientation, the cam surfaces 804 can contact cam follower surfaces 810 of the cranks 806.

Figure 8G:
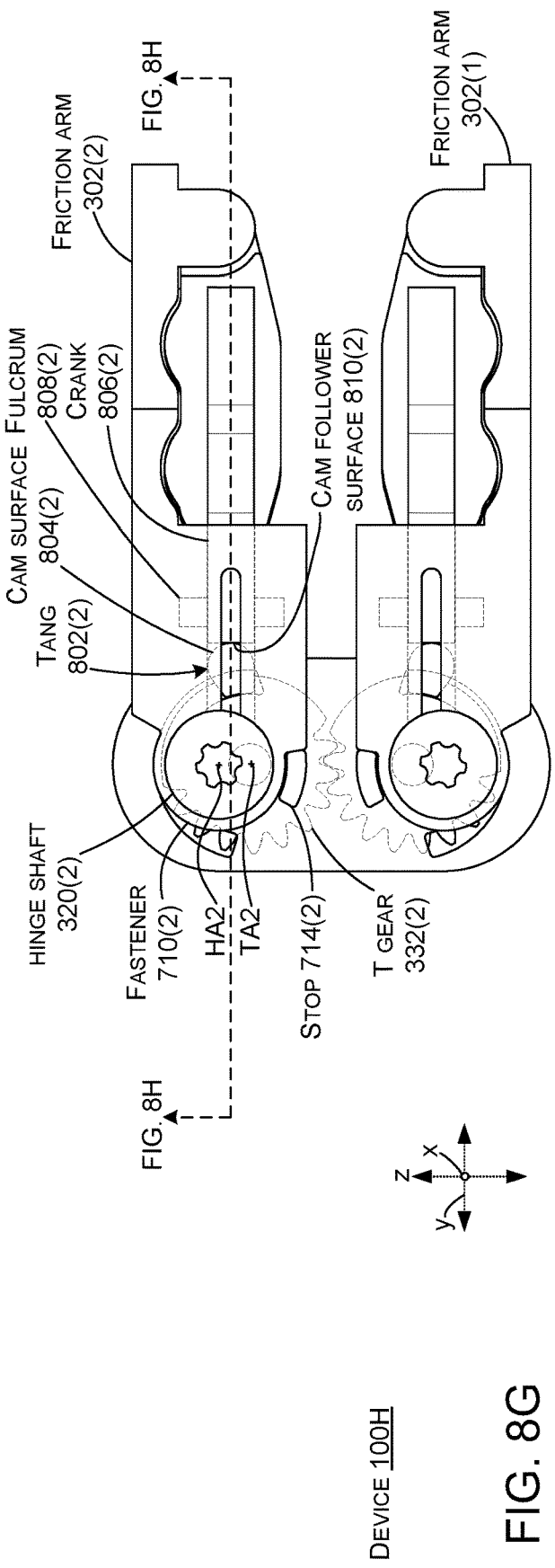

As can be seen by comparing the 180-degree orientation of FIG. 8F with the closed orientation of FIG. 8G, this co-location of the tangs 802 and the cranks 806 can result because the tangs 802 are resident on the timing gears 332 while in this implementation, the cranks 806 are resident in the friction arms 302. The timing gears 332 rotate around the timing axes TA while the friction arms 302 rotate around the hinge axes HA. Due to the offset axes of rotation, the cranks 806 approach the tangs 802 at a range of rotation approaching the zero-degree orientation of FIG. 8G, such as at about 30 degrees or less. Thus, while the cranks 806 are not contacting the tangs 802 in the 180-degree orientation of FIG. 8F, as the device is rotated toward the closed position of FIG. 8G, the cranks 806 and tangs 802 approach one another. In this example implementation, at about 20-30 degrees, the cam surfaces 804 of the tangs start to engage the cam follower surfaces 810 of the cranks and cause linear movement between the tangs 802 and the cranks 806.

Figure 8H:
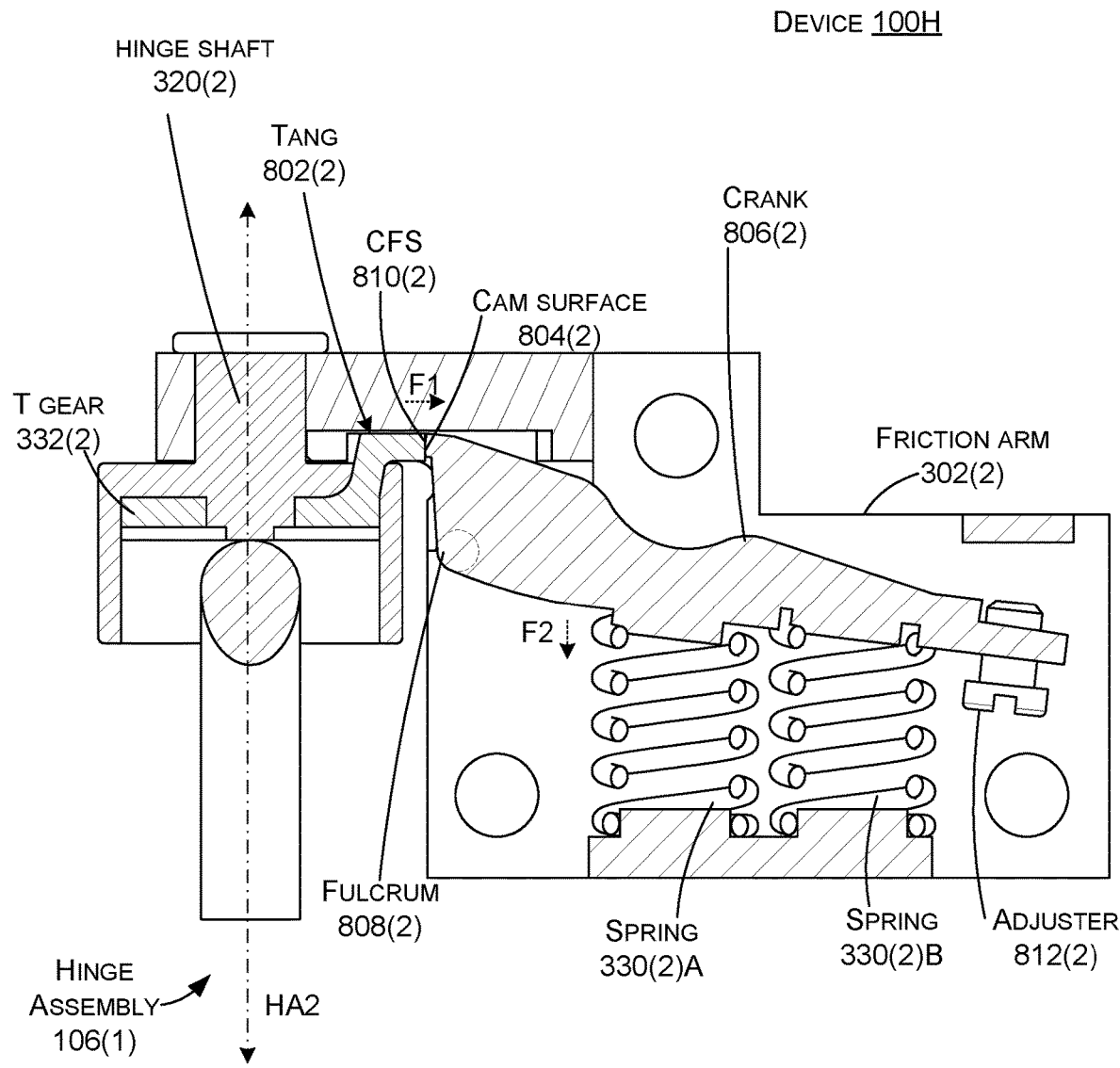

As shown in FIG. 8G, this cam contact between the cam surfaces 804 of the tangs 802 and the cam follower surfaces 810 of the cranks 806 can force the cam follower surfaces 810 away from the hinge axes. The movement of the cam follower surfaces 810 forces the cranks 806 to rotate around the fulcrums 808 and compress springs 330. In this example, the springs 330 are oriented parallel to the hinge axes, though other configurations can be employed. From one perspective, in this implementation as shown in FIG. 8H, the cranks 806 can rotate at the fulcrums 808 to transfer a force F1 that is perpendicular to the hinge axis to a force F2 that is parallel to the hinge axis and thereby compress the springs that are positioned parallel to the hinge axes HA.

Employing cranks 806 can offer several potential technical benefits. These technical benefits can include the option of employing multiple springs 330 relative to an individual hinge axis. The benefits can also include orientating and/or positioning of the springs in a less congested portion of the device/hinge assembly. The pop-up angle can easily be adjusted via an adjuster 812. The cranks 806 can provide a mechanical advantage that can allow greater force at the follower end (e.g., the cam follower surface 810) relative to the total spring force. (leverage ratio). The geometry of the cranks can be modified to change the rate of force change at the follower end relative to the rate of force change at the springs. For instance, even though the spring force necessarily increases as the springs are compressed, the force at the follower end may increase or decrease at a different rate. Any and/or all of the above technical benefits can result in better control of the resulting pop-up torque and the angle range over which it occurs.

In this case, two springs 330 (e.g. springs 330(1)A and 330(1)B, and springs 330(2)A and 330(2)B) are associated with each crank 806, though a single spring could be employed or more than two springs could be employed. As mentioned above, the compressed springs 330 can provide the pop-up force to open the device. In this implementation, the springs 330 are retained between the friction arms 302 at the lower end and the timing arms 306 at the upper end. The resting (e.g., non cammed) posture of the cranks 806 can be adjusted via the adjuster 812. In this case, the adjuster 812 is manifest as a threaded screw that can control the height of the distal end of the timing arm 306 by acting against the friction arms 302.

The adjuster 812 can be used to set the angle at which the cam (e.g., cam surfaces 804) engage the cam followers (e.g., cam follower surfaces 810) and therefore the extent to which the pop-up occurs. Thus, this adjuster can be used to compensate for manufacturing variations that would otherwise result in variation of the pop-up angle.

In some implementation, the gear tangs 802, in addition to acting as pop-up cams, also act as timing elements by precisely fitting inside travel slots 326 inside of the friction arms 302. Thus, this timing function is analogous to the travel pins 318 and slots 326 in implementations described above (e.g., the tangs 802 can be viewed as a particular implementation of travel pins that perform multiple functions. Thus, in this case the tangs 802 provide the technical benefit of defining relative movement between the timing gears and the friction arms and providing a force to compress the springs to store the pop-up force. Thus, a single element (e.g., the tangs) can provide multiple functionalities.

Multiple implementations are described above where the timing gears 332 can rotate around their own timing axes TA rather than rotating around the hinge axes HA. This feature can provide multiple advantages over traditional designs.

Individual elements of the hinge assemblies can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, and/or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-8H.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a first portion and a second portion that are rotatably secured around first and second hinge axes through a range of rotation from a closed orientation to an open orientation and first and second timing arms that define first and second timing gears that intermesh through the range of rotation to synchronize rotation around the first and second hinge axes, the timing gears rotating around first and second timing axes that are parallel to and not co-extensive with the hinge axes, the first and second timing arms configured to be biased toward the timing axes relative to the first and second portions at the closed orientation and to create a pop up force on the first and second portions from the bias.

Another example can include any of the above and/or below examples where the first portion is secured to a first friction arm and the second portion is secured to a second friction arm, and wherein the first friction arm is rotationally secured around a first hinge shaft that defines the first hinge axis and the second friction arm is rotationally secured around a second hinge shaft that defines the second hinge axis.

Another example can include any of the above and/or below examples where the device further comprises a communication member that defines the first and second hinge shafts.

Another example can include any of the above and/or below examples where the first and second timing gears are positioned within the communication member that defines the first and second hinge shafts.

Another example can include any of the above and/or below examples where the first timing arm can move linearly relative to the first friction arm toward and away from the first hinge axis and the first timing arm can rotate axially relative to the first friction arm within a defined angular range.

Another example can include any of the above and/or below examples where the first timing arm defines a first travel slot and the first friction arm defines a first travel pin and interaction of the first travel pin in the first travel slot allows the relative linear movement and defines the relative axial rotation, or wherein the first timing arm defines a first travel pin and the first friction arm defines a first travel slot and interaction of the first travel pin in the first travel slot allows the relative linear movement and defines the relative axial rotation.

Another example includes a first portion and a second portion that are rotatably secured to a hinge assembly that defines a first hinge axis that the first portion rotates around and a second hinge axis that the second portion rotates around and the hinge assembly further comprising a first timing gear associated with the first portion and a second timing gear associated with the second portion, the first timing gear rotating around a first timing axis that is parallel to and offset from the first hinge axis, the second timing gear rotating around a second timing axis that is parallel to and offset from the second hinge axis, the first and second timing gears directly intermeshing with one another to synchronize rotation around the first hinge axis and the second hinge axis.

Another example can include any of the above and/or below examples where the hinge assembly comprises a communication member that defines both the first and second hinge axes and the first and second timing axes.

Another example can include any of the above and/or below examples where the first timing gear defines a first travel slot and the second timing gear defines a second travel slot, or wherein the first timing gear defines a first travel pin and the second timing gear defines a second travel pin.

Another example can include any of the above and/or below examples where the first travel slot allows relative linear movement between the first timing gear and the first portion and defines and limits relative rotational movement between the first timing gear and the first portion, and wherein the second travel slot allows relative linear movement between the second timing gear and the second portion and defines and limits relative rotational movement between the second timing gear and the second portion.

Another example can include any of the above and/or below examples where the first timing pin comprises a first tang that defines a first cam surface and the second timing pin comprises a second tang that defines a second cam surface.

Another example can include any of the above and/or below examples where the first tang allows and defines an extent of relative linear movement between the first timing gear and the first portion and allows and defines relative rotational movement between the first timing gear and the first portion, and wherein the second tang allows and defines relative linear movement between the second timing gear and the second portion and allows and defines relative rotational movement between the second timing gear and the second portion.

Another example can include any of the above and/or below examples where the first cam surface acts on a first cam follower at a range of orientations that includes zero degrees to store pop-up energy relative to the first portion, and wherein the second cam surface acts on a second cam follower at a range of orientations that includes zero degrees to store pop-up energy relative to the second portion.

Another example can include any of the above and/or below examples where the device further comprises a first biasing member to store the pop-up energy relative to the first portion, and a second biasing member to store the pop-up energy relative to the second portion.

Another example can include any of the above and/or below examples where the first biasing member comprises a first spring, and wherein the second biasing member comprises a second spring.

Another example can include any of the above and/or below examples where the first cam follower is defined by a first crank and the second cam follower is defined by a second crank, and wherein engagement of the first cam surface on the first cam follower surface causes the first crank to compress the first spring to store the pop-up energy relative to the first portion, and wherein engagement of the second cam surface on the second cam follower surface causes the second crank to compress the second spring to store the pop-up energy relative to the second portion.

Another example can include any of the above and/or below examples where the first timing gear is part of a first timing arm and the second timing gear is part of a second timing arm.

Another example can include any of the above and/or below examples where the first timing gear includes an element that at least in part allows the first timing gear to move linearly relative to the first portion in a direction perpendicular to the first hinge axis and defines relative rotational movement between the first timing gear and the first portion.

Another example can include any of the above and/or below examples where the element is a pin or a slot.

Another example can include any of the above and/or below examples where the device further comprises a first plunger positioned in the first portion, the first plunger associated with a spring, and wherein when rotation of the first and second portions approaches a zero-degree orientation, the plunger engages a stop on the hinge assembly and compresses the spring to store pop-up energy.

Another example can include any of the above and/or below examples where the stop is defined by a communication member that defines both the first hinge axis and the first timing axis, and wherein engagement with the stop forces the plunger away from the first hinge axis and the first timing axis.

Another example includes a device comprising a hinge assembly that rotatably secures a first portion relative to a first hinge axis and a second portion relative to a second hinge axis to allow the first and second portions to rotate from a closed orientation to an open orientation and the hinge assembly including first and second timing arms configured to both synchronize rotation around the first and second hinge axes and to convey a pop-up force on the first and second portions in the closed orientation.

The invention claimed is:

1. A device, comprising:
   a first portion and a second portion that are rotatably secured to rotate around a first hinge shaft that defines a first hinge axis and second hinge shaft that defines a second hinge axis through a range of rotation from a closed orientation to an open orientation;
   first and second timing arms that define first and second timing gears positioned at least partly in opposing ends of an obround-shaped communication member; and,
   the first and second timing gears intermesh through the range of rotation to synchronize rotation around the first and second hinge axes, the first timing gears rotating around a first timing shaft that defines a first timing axis and the second timing gears rotating around a second timing shaft that defines a second timing axis, the first and second timing shafts are parallel to and not co-extensive with the first and second hinge shafts, the first and second timing arms configured to be biased toward the timing axes relative to the first and second portions at the closed orientation and to create a pop up force on the first and second portions from the bias.

2. The device of claim 1, wherein the first portion is secured to a first friction arm and the second portion is secured to a second friction arm.

3. The device of claim 2, wherein the first timing arm can move linearly relative to the first friction arm toward and away from the first hinge axis and the first timing arm can rotate axially relative to the first friction arm within a defined angular range.

4. The device of claim 3, wherein the first timing arm defines a first travel slot and the first friction arm defines a first travel pin and interaction of the first travel pin in the first travel slot allows the relative linear movement and defines the relative axial rotation, or wherein the first timing arm defines a first travel pin and the first friction arm defines a first travel slot and interaction of the first travel pin in the first travel slot allows the relative linear movement and defines the relative axial rotation.

5. A device, comprising:
   a hinge assembly comprising an obround-shaped communication member through which first and second hinge axes pass at a fixed distance from one another;
   a first portion that is secured to the hinge assembly to rotate around the first hinge axis and a second portion that is secured to the hinge assembly to rotate around the second hinge axis; and,
   the hinge assembly further comprising a first timing gear associated with the first portion and positioned at least partly in the communication member and a second timing gear associated with the second portion and positioned at least partly in the communication member, the first timing gear rotating around a first timing axis that is parallel to and offset from the first hinge axis, the second timing gear rotating around a second timing axis that is parallel to and offset from the second hinge axis, the first and second timing gears directly intermeshing with one another to synchronize rotation around the first hinge axis and the second hinge axis.

6. The device of claim 5, wherein the first timing gear defines a first travel slot and the second timing gear defines a second travel slot, or wherein the first timing gear defines a first travel pin and the second timing gear defines a second travel pin.

7. The device of claim 6, wherein the first travel slot allows relative linear movement between the first timing gear and the first portion and defines and limits relative rotational movement between the first timing gear and the first portion, and wherein the second travel slot allows relative linear movement between the second timing gear and the second portion and defines and limits relative rotational movement between the second timing gear and the second portion.

8. The device of claim 5, wherein the first timing gear is part of a first timing arm and the second timing gear is part of a second timing arm.

9. The device of claim 5, wherein the first timing gear includes an element that at least in part allows the first timing gear to move linearly relative to the first portion in a direction perpendicular to the first hinge axis and defines relative rotational movement between the first timing gear and the first portion.

10. The device of claim 9, wherein the element is a pin or a slot.

* * * * *